US008871826B2

(12) United States Patent
Butzloff et al.

(10) Patent No.: US 8,871,826 B2
(45) Date of Patent: Oct. 28, 2014

(54) HYBRID POLYMER COMPOSITIONS WITH ENHANCED BIO-DEGRADABILITY

(75) Inventors: Peter Butzloff, Bristol, NH (US); Robert Berger, Huntington Beach, CA (US); Jamie Antongiovanni, Huntington Beach, CA (US)

(73) Assignee: GraphicPak Corporation, Huntington Beach, CA (US)

( * ) Notice: Subject to any disclaimer, the term of this patent is extended or adjusted under 35 U.S.C. 154(b) by 158 days.

(21) Appl. No.: 12/985,994

(22) Filed: Jan. 6, 2011

(65) Prior Publication Data

US 2011/0162955 A1 Jul. 7, 2011

Related U.S. Application Data

(60) Provisional application No. 61/292,769, filed on Jan. 6, 2010.

(51) Int. Cl.
| | |
|---|---|
| C08F 290/06 | (2006.01) |
| B82Y 30/00 | (2011.01) |
| B01J 23/745 | (2006.01) |
| H01B 1/12 | (2006.01) |
| B01J 35/00 | (2006.01) |
| B01J 23/30 | (2006.01) |
| B01J 31/06 | (2006.01) |
| B01J 23/20 | (2006.01) |
| B01J 21/06 | (2006.01) |

(52) U.S. Cl.
CPC ............... *H01B 1/122* (2013.01); *B82Y 30/00* (2013.01); *B01J 23/745* (2013.01); *B01J 35/004* (2013.01); *B01J 23/30* (2013.01); *B01J 31/06* (2013.01); *B01J 23/20* (2013.01); *B01J 21/063* (2013.01); *B01J 35/006* (2013.01)
USPC ............... 522/81; 522/83; 524/406; 524/408; 524/431; 524/435; 524/847; 588/317

(58) Field of Classification Search
USPC ............ 204/157.75; 524/406, 408, 431, 435, 524/847; 588/317, 309; 522/81, 83
See application file for complete search history.

(56) References Cited

U.S. PATENT DOCUMENTS

| | | | | |
|---|---|---|---|---|
| 4,444,714 | A | * | 4/1984 | Martenson ............... 264/328.18 |
| 5,258,422 | A | * | 11/1993 | Chang et al. ................. 523/124 |
| 5,545,485 | A | * | 8/1996 | Hashitani et al. .......... 428/423.1 |
| 6,235,388 | B1 | * | 5/2001 | Yamamoto et al. ............ 428/364 |
| 2004/0034121 | A1 | * | 2/2004 | Nozaki et al. ................. 523/124 |
| 2004/0034128 | A1 | * | 2/2004 | Tokiwa et al. .................. 524/21 |
| 2006/0111460 | A1 | * | 5/2006 | Wakamura et al. ................ 522/6 |
| 2006/0235113 | A1 | * | 10/2006 | Dorgan et al. .................. 524/13 |
| 2008/0009616 | A1 | * | 1/2008 | Frank et al. ................ 536/123.1 |
| 2010/0314162 | A1 | * | 12/2010 | Gardner et al. ............... 174/258 |

FOREIGN PATENT DOCUMENTS

| | | | | |
|---|---|---|---|---|
| JP | 2008-303300 | | * 12/2008 | ............ C08L 101/00 |
| JP | 2008303300 | A | 12/2008 | |
| WO | WO-2008038350 | A1 | 4/2008 | |

OTHER PUBLICATIONS

Yu, H.; Quan, X.; Chen, S.; Zhao, H.; Zhang, Y.; Journal of Photochemistry and Photobiology A: Chemistry, 2008(200), pp. 301-306.*
Kedem, S.; Schmidt, J.; Paz, Y.; Cohen, Y.; Langmuir, 2005(21), pp. 5600-5604.*
Sillanpaa, M.; Paunu, T.M.; Sionio, P.; Aggregation and deposition behaviour of titanium dioxide in natural waters, 2010.*
Winkler, J.; Titanium Dioxide, 2003, pp. 12-16.*
Yew, S.P., et al.; Polymer Degradation and Stability, 2006, pp. 1800-1807.*
Nakayama, N., et al.; Polymer Degradation and Stability, 2007, pp. 1255-1264.*
Zan, L., et al.; Polymer, 2006, pp. 8155-8162.*
Gesenhues, U.; Polymer Degradation and Stability, 2000, pp. 185-196.*
Jihui Li, et al., "Preparation and Photocatalysis Property of Exfoliated graphite by In-situ Inserting nano-$TiO_2$", Catalysis Letters, vol. 129 Nos. 1-2 (2009).
Li-Wu Zhang, et al., "Efficient $TiO_2$ Photocatalysts from Surface Hybridization of $TiO_2$ Particles with Graphite-like Carbon", Advanced Functional Materials, vol. 18, Issue 15, Aug. 11, 2008.
Hongtao Yu, et al., " $TiO_2$-carbon nanotube heterjunction arrays with a controllable thickness of $TiO_2$ layer and their first application in photocatalysis", Journal of Photochemistry and Photobiology A: Chemistry, 200 (2008).
PCT International Search Report dated Oct. 26, 2011, issued in connection with counterpart International Application No. PCT/US2011/020408.

* cited by examiner

*Primary Examiner* — Robert Jones, Jr.
(74) *Attorney, Agent, or Firm* — Mintz Levin Cohn Ferris Glovsky and Popeo, P.C.

(57) ABSTRACT

A hybrid polymer composition can include a polymeric material that has dispersed within it a plurality of photocatalytic particles and a plurality of conductive particles at least some of which are in contact with one or more of the plurality of photocatalytic particles such that the conductive particles provide electron donating and electron accepting properties to the photocatalytic particles to enhance the creation of free radicals upon exposure of the hybrid polymer composition to one or more degradation enhancing factors. Examples of degradation enhancing factors can include, but are not limited to, one or more of visible light, ultraviolet light, moisture, and ozone. The photocatalytic particles can include a metal oxide, such as for example titanium dioxide and/or another non-toxic metal oxide. Related methods, articles, and the like are described.

21 Claims, 19 Drawing Sheets ent application claims prior to and incorporates by
HYBRID POLYMER COMPOSITIONS WITH ENHANCED BIO-DEGRADABILITY

CROSS-REFERENCE TO RELATED APPLICATION

The current application claims prior to and incorporates by reference in its entirety, U.S. provisional application for patent No. 61/292,769, filed on Jan. 6, 2010 and entitled "Hybrid Polymer Compositions With Enhanced Bio-Degradability."

TECHNICAL FIELD

The subject matter described generally herein relates to polymer compositions that can provide, among other possible benefits, improved heat stability, degradation (e.g. bio-degradation, chemical degradation, and the like), photocatalytic depolymerization, antibacterial activity, and barrier properties.

BACKGROUND

Polymeric materials with well-defined barrier properties, rates of degradability (e.g. bio-degradability, chemical degradability, and the like) and compostability, and general workability are desirable for many applications. However, concerns continue to grow over disposal of items manufactured with polymeric materials and the long term persistence of such materials due to their resistance to bio-degradation.

SUMMARY

In one aspect, a composition of matter includes a polymeric material, a plurality of photocatalytic particles dispersed within the polymeric material, and a plurality of conductive particles dispersed within the polymeric material. The photocatalytic particles include a metal oxide. At least some of the plurality of conductive particles are in contact with one or more of the plurality of photocatalytic particles such that the at least some of the plurality of conductive particles provide electron donating and electron accepting properties to the one or more photocatalytic particles with which the at least some of the plurality of conductive particles are in contact.

In related variations, a composition of matter can include one or more of the following features. The composition of matter can include a structure in which the photocatalytic and conductive particles are connected by chemical bonds linked in space by polymer chains of the polymer material. The photocatalytic particles can have effective diameters of greater than approximately 350 nm, or alternatively greater than one micron, or alternatively greater than approximately 60 microns. The metal oxide can include a non-toxic metal oxide selected from titanium dioxide ($TiO_2$), tungsten oxide ($WO_2$), sodium tantalum oxide (NaTaO), and/or other non-toxic metal oxides. The metal oxide can further include iron oxide (e.g. $Fe_2O_3$), for example at a mass ratio of approximately 0.5% of less of the photocatalytic particle mass.

The plurality of conductive particles can include at least one of graphite particles, graphene particles, amorphous carbon pigment particles, iron oxide or hematite ($Fe_2O_3$), carbon nanotubes, and C-60 buckminsterfullerene molecules. The composition of matter can further include a plurality of ion-exchanged clay particles dispersed within the polymeric material. The polymeric material can include at least one of a polylactic acid (PLA), a polyamide, a polycarbonate (PC), a polyester, a polyurethane, a polypropylene (PP), a polyvinyl chloride (PVC), a polyethylene terephthalate (PET), a high density polyethylene (HDPE), a low density polyethylene (LDPE), a polystyrene, a polyhydroxyalkanoate (PHA), a polyhydroxybutyrate (PHB), a polyhydroxyhexanoate (PHH), a polyhydroxyvalerate (PHV), a polysaccharide, a polycaprolactone, a polyglycolic acid, a polyhydroxyvalerate, a chitin, a chitosan, a poly(L-cysteine), a crosslinked soy oil, a crosslinked lethecin, and a wafer baked starch.

A light masking agent can be disposed at or proximate to an outer surface of the polymeric material. The light masking agent can reduce an amount of light that reaches the plurality of photocatalytic particles during a useful life of an item constructed from or otherwise including the composition of matter and can be removable to allow degradation of the polymeric material once the item reaches an end of the useful life. The light masking agent can optionally achieve its removability by virtue of solubility in water and/or some other solvent. The light masking agent can include at least one of an ion-exchanged montmorillonite, a pigment that reflects and/or absorbs light, a dye that reflects and/or absorbs light, inks, a film that reflects and/or absorbs light, and titanium dioxide ($TiO_2$) particles having an effective diameter less than approximately 350 nm.

In an interrelated aspect, a method for enhancing degradation of any of the compositions of matter described herein and/or noted above can include exposing the composition of matter to light that includes at least one of visible and ultraviolet light. The light can optionally activate at least some of the plurality of photocatalyst particles to create free-radicals that react with the polymer material. Alternatively or in addition, a composition of matter can be exposed to ozone and/or water vapor. The ozone can participate in free-radical decomposition and depolymerization of the polymer material. In some variations, a concentration of the ozone can be greater than or equal to approximately 3 ppm. The composition of matter can be exposed to greater than 60% relative humidity to enhance free-radical decomposition of the polymer material. A light masking agent can be removed prior to the exposure to visible and/or ultraviolet light, for example by rinsing or otherwise exposing a composition of matter to a liquid solvent (e.g. water, alcohol, and the like).

In another interrelated aspect, a method for making any of the compositions of matter described herein and/or noted above can include combining low molecular weight precursors of the polymeric material with the photocatalytic particles and the conductive particles in a mixture and irradiating the mixture with a source of activating energy sufficient to cause free radical formation and localized heating of the mixture at surfaces of at least one of the photocatalytic particles and the conductive particles. The activating energy can optionally include at least one of visible light, ultraviolet light, and microwave energy. The method can optionally further include creating elongational shear in the mixture during the irradiating. The elongational shear can act to maintain orientation and separation of the photocatalytic particles and the conductive particles within the mixture.

One or more advantages may be related to various features of the current subject matter. Some implementations of the current subject matter can include polymer compositions that include one or more of graphene, ion-exchanged clay, and titanium dioxide ($TiO_2$) in the anatase crystal form. Each of these nano-particles can function as a free radical initiator catalyst. Combinations of graphene with $TiO_2$ can in some implementations provide greater catalytic activity than either of these nano-particles alone. Additional photocatalytic and free-radical generating enhancements to these nano-particle combinations can be achieved by the addition iron impurities to the $TiO_2$ nanoparticles in the form of $Fe_2O_3$. In some implementations, the iron impurities can include less than approximately 0.5% by mass of iron. The polymer composition can include one or more accumulated, polymerized substrates composed of biodegradable resin and resin monomers. These resins and resin monomers can include, but are not limited to, hydroxyalkanoate, hydroxybutyrate, hydroxyhexanoate, hydroxyvalerate, lactic acid, caprolactone, caprolactam, butylene succinate, butylene succinate adipate, aliphatic ester, L-cysteine, starch, destructurized starch, lethecin, soy oil, aliphatic-aromatic copolyesters (AAC), and the like, either individually, or in combination. Resins and resin monomers that are not biodegradable can also be used with the current subject matter.

Hybrid materials consistent with implementations of the current subject matter can include biomonomers such as those traditionally accumulated to form natural polyesters (exemplified by PLA, PCL, PHA) while also accumulating their polymer building blocks with nano-particles of graphene, or clay, or a mixture of both these particles or their like. A free-radical process described herein can be used in producing these materials. Creation of these materials may be used to provide a commercially desirable "premix" that can be used in molding and extrusion processes involving the fabrication of biopolymeric materials.

Nanoparticles of conductive or non-conductive nature can initiate "charge-transfer" free-radical polymerization of organic monomers facilitated by microwave irradiation to allow combination of their characteristics with the biodegradable properties of natural polyesters. A polymeric matrix can be created to generate new nano-particle-based specialty polymeric materials with well dispersed nano-particle compositions. Free-radical chemical reactions can occur to accumulate around each nano-particle, thereby providing new block co-polymer-co-nano-particle compositions with desirable properties.

Additional advantages can be achieved using elongational fluid flow, for example in a fixture or plastic extrusion machine to create elongational shear. The part of the apparatus which imparts elongational mixing of the fluid containing the monomers can be transparent to microwave radiation to allow simultaneous controlled heating and orientation of the nano-particles contained within the mixture being processed. The elongational fluid flow can be used to maintain orientation and separation of the nano-particles, while monomers and solvents are subjected to microwave irradiation to accelerate accumulation of reactants inside the flow-field. This process can establish conditions that are advantageous for achieving nanometer-level particle and molecule accumulations with precise placement. Unlike previously existing processes that employ screws and other methods where shear viscosity rather than elongational flow anchors and fixes the material within a desired and preferred orientation, elongational flow according to one or more implementations of the current subject matter can "fix" the components forming the mixture in a manner that synergistically prevents clumping of particles while maintaining relative positions that are desirable for overall structural alignment to achieve superior barrier material properties, such as for food packaging use. The structure of a polymer material can include a substantially linear end-to-end series of accumulated block co-polymer with insertions of flat block co-nano-particles of high aspect ratio such that the accumulated structure provides a layered series of linkages conceptually similar to stacks of sheets separated by accumulated molecular linkages. This assembly can include an assembly of single nano-particles connected by chemical bonds linked in space by polymers to form a hybrid nano-composite material.

Microwave radiation can accelerate the polymerization rate of polymeric materials compared to conventional heating. The use of graphene molecules and/or other conductive particles or nano-particles as in situ catalysts in conjunction with the application of microwave irradiation can be further enhanced when in electrochemical contact with the anatase form of nanoparticles containing $TiO_2$ and/or other metal oxides. Further advantages can be achieved in some implementations when the metal oxide nano structure contains not more than approximately 0.5% by weight $Fe_2O_3$ to provide superior catalytic reaction rate enhancement. The use of $TiO_2$ and/or $TiO_2$ with $Fe_2O_3$ impurities can provide superior results to the use of water-leachable catalysts such as the binary catalyst $SnCl_2$ with para-toluene sulfonic acid, or benzoyl peroxide. Moreover, the use of undesirable or poisonous catalysts not suitable for food use can be avoided, for example those containing copper, chromium, borates, or the like. Graphene nano-particulate materials, when used in accordance with various implementations of the current subject matter, can substantially reduce or even eliminate leaching of undesirable materials out of packaging materials intended for food contact because the graphene molecules and nano-platelets actually co-react with the monomer and become integral parts of the structure of a hybrid polymer material. Leaching can thereby be at least partially or even completely avoided by the use of free radical initiation in microwave assisted free-radical catalysis using reactive nano-particle adducts.

Significant advantages for food packaging applications can also be conferred by avoidance of potential polycyclic aromatic hydrocarbon (PAH) contaminants in the nano-particle mixtures when used in accordance with the teachings of the current subject matter, especially in comparison to conventional pigments such as amorphous carbon particles for use in food contact that must be rigorously controlled to meet FDA controls for PAH due to the nature of their feedstock production. Considerable commercial advantage can be realized by using nano-particles such as graphene not only as a catalyst material, but as an extender to further improve barrier and structural properties due to the structural incorporation of graphene as an accumulated reinforcement within the biopolymer. In further implementations, another monomer, such as a biomonomer like hydroxybuyrate monomers used to accumulate polyhydroxybuyrate (PHB), can substitute for part or all of the lactic acid monomer used to accumulate poly lactic acid (PLA) in a chemical co-polymerization with graphene, $TiO_2$, or another nano-particle type, such as an ion-exchanged clays (for example montmorillonite).

Implementations of the current subject matter can provide one or more advantages. For example, composite compositions can include one or more substantially co-polymerized nano-particles of high aspect ratio in covalent combination with a resin component and a matrix or binder material. The composite can include one or more of graphene nano-particles, ion-exchanged clay, and the like used individually or in combination with a free-radical addition process to monomers to provide addition terminated films of polymer compositions. Mechanical forming of the bulk of the film can then be temporarily enabled due to the microscopic molecular scale melting of substantially those undesirable crystalline regions in the polymer composition in the immediate contact with nanoparticulate regions of the composition as the bulk of this material is subjected to microwave irradiation. In some examples, irradiated graphene can be at a temperature about 11° C. higher than the temperature of the bulk medium in which it is dispersed. This microscale temperature differential can cause preferential softening of local crystalline polymeric regions subject to void formation and fracture initiation, while preserving preferentially the desirable stiffness of amorphous regions subject to elongation with preferrential molecular orientation. The overall mechanical properties of the bulk can thereby be temporarily improved so that catastrophic film failure during elongational mechanical processing can be avoided, and a desirable stretching and forming operation of the material can be enabled. Orientation can be conferred to both molecular and nanoparticulate regions, in some examples to be substantially parallel to the plane of the film to enhance mechanical properties of the finished material while imparting excellent gas barrier and moisture resistance. These and other attributes of materials consistent with the current subject matter can provide more economic, cost effective, and simplified production of packaging films consisting of fewer layers, or of a single layer with multiple desirable properties and attributes.

Another advantage of materials consistent with the current subject matter involves enhanced sterilization properties of packaging materials. Food bacteria, viruses, and other pathogens that are sensitive to free radical attack can be destroyed or deactivated by free radicals produced by contact of light (e.g. ultraviolet and/or visible light) and/or moisture with a material according to the current subject matter. These free radicals can break bacterial cell walls or otherwise chemically and/or physiologically alter bacteria and other pathogens, which can lead to reduced bacterial populations. This feature can provide important enhancements to sterility of stored food.

The product of Planck's constant (h) and frequency (v) throughout this disclosure denotes addition of energy though absorbance of electromagnetic radiation by a molecule, atom, particle, or other quantum of matter. The symbols R, R', and R" are used in the figures and foregoing disclosure to represent a functional group including, but not limited to, one or more carbon atoms, one or more hydrogen atoms, a combination of hydrogen atoms and carbon atoms, or other functional groups including, but not limited to, one or more other elements.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
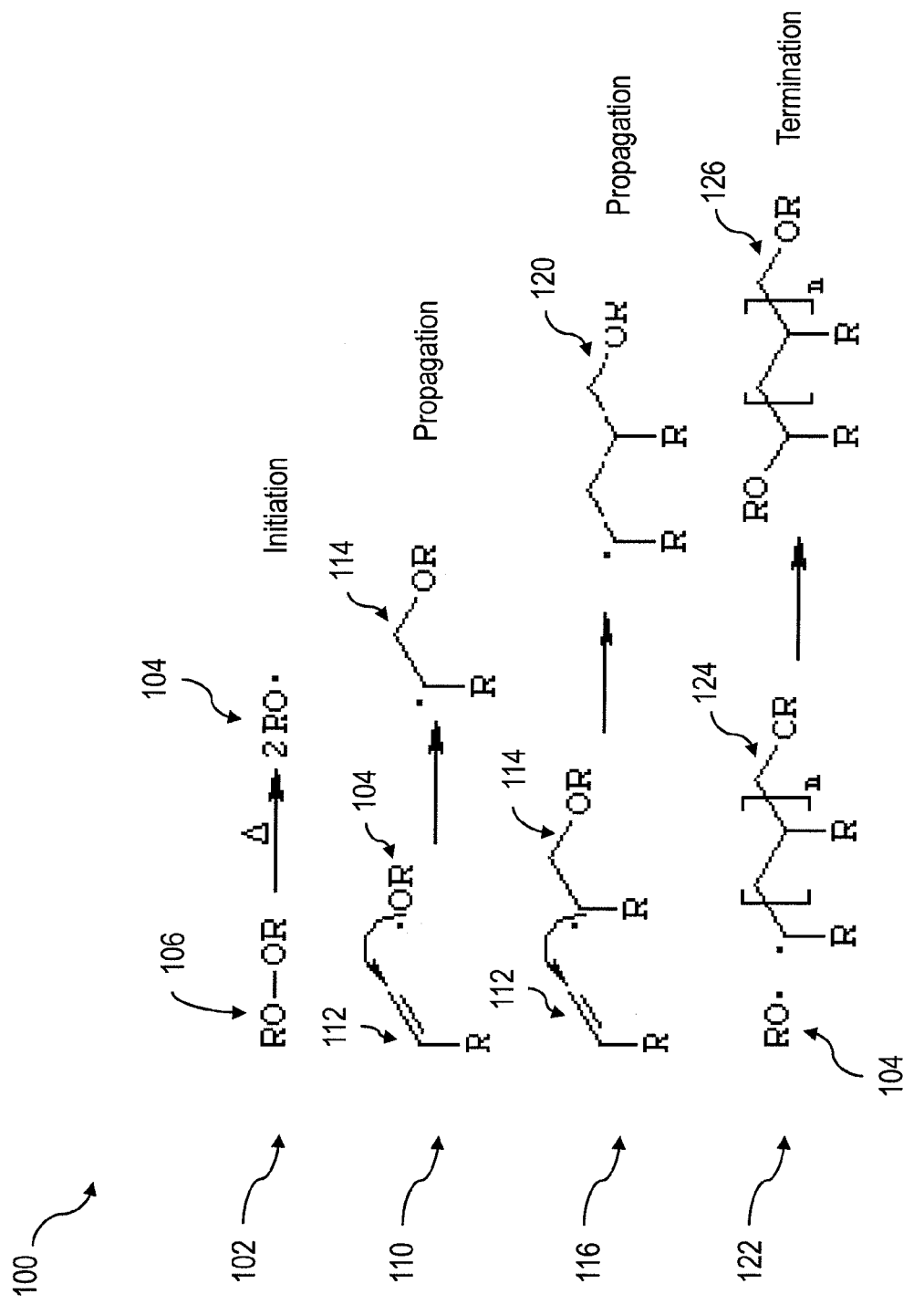
FIG. 1 is a reaction diagram illustrating examples of free radical initiation, accumulation propagation, and accumulation termination reactions.

Various aspects of the current subject matter can provide articles of manufacture, methods, and systems incorporating combinations of polymer materials and catalytic particles to provide, among other possible advantages, packaging materials and other plastic or polymer products having improved workability and degradability (for example by bio-degradation, chemical degradation, and the like). In some aspects, one or more of photocatalytic particles, such as for example titanium dioxide ($TiO_2$), tungsten oxide ($WO_2$), sodium tantalum oxide (NaTaO), and other non-toxic metal oxides and the like, and conductive particles capable of donating or receiving free electrons, such as for example graphene nano-platelets, ion-exchanged clay nano-particles, and the like, can be included in a working mixture of polymeric monomers. The following descriptions and explanations of features that can be present in various implementations and variations of the current subject matter are described in relation to a polymeric composition of polylactic acid (PLA) containing conductive particles comprising graphene and photocatalytic particles comprising titanium dioxide. These illustrative examples, however, should not be construed as limiting of the scope of the protected subject matter, except to the extent that they appear in the claims presented at the end of this specification.

Polar functional groups on free and polymerized monomer materials and/or on ion-exchanged clay nano-particles or the like can be preferentially adsorbed by photocatalytic particles, whose surfaces can also be of a polar nature. To enhance degradation of such a polymer composition, for example during, prior to, or after disposal of an article or item containing the polymer material, one or more of visible light, ultraviolet (UV) light, and microwave electromagnetic radiation can be applied to energize conductive particles dispersed within the polymer material. Energy absorbed in this manner can facilitate a transfer of electrons to and from the photocatalytic particles, thereby causing the photocatalytic particles to more readily participate in the formation of free radicals which can be mobilized into solution to be transported away from the vicinity of the photocatalytic particle surface or to react with nearby charged polar groups, such as, for example, polar groups participating in hydrogen bonding to the surface of the photocatalytic particles.

One or more of the polymer mixtures described herein can be extruded into blown films, formed into a continuous web of rollstock, or produced in other useful forms, such as for example containers (e.g. plastic bottles and boxes), fitments, (e.g. for enabling sealing and subsequent re-sealable opening of non-rigid pouches or bags constructed of barrier films), medical supplies, packaging materials, electronic device components, plastic utensils, plastic bags, ad the like. In one example, a package can be formed of one of more laminated layers of a barrier film and can be filled with perishable or non-perishible commodities including, but not limited to, cosmetics, foodstuffs, slurries such as toothpaste or applesauce, industrial liquids, carbonated or non carbonated beverages, grease, oils, and the like. Packages including features of the current subject matter can, in some implementations, be sealed with a fitment or closure to enable selective or discontinuous disbursement of the package contents. All or part of the external surfaces of a package can be treated to enable the application of decorative, informational, or instructional print helpful to identify the package contents, proper use and disposal of the package, or the like. The current subject matter can be used in conjunction with polymeric compositions including, but not limited to, polylactic acids (PLA), polyamides, polycarbonates (PC), polyesters and natural polyesters, polyurethanes, polypropylenes (PP), polyvinyl chlorides (PVC), polyethylene terephthalates (PET and PETE), high and low density polyethylenes (HDPE and LDPE), polystyrenes, polyhydroxyalkanoates (PHA), and polysaccharides (e.g. chitin and chitosan).

FIG. 1 shows reaction diagrams illustrating examples of free radical initiation, accumulation propagation, and accumulation termination. An initiation reaction 102 can include creation of oxygen radicals (RO.) 104 by splitting the O—O bond of a peroxide molecule 106 by irradiation with one or more frequencies of electromagnetic radiation, such as for example visible light, ultraviolet light, microwave energy, and the like, either alone or in combination. In the drawings and description provided herein, a dot (.) denotes a free radical along with the location of the free electron. FIG. 1 also shows a first propagation reaction 110 and in which addition of an oxygen radical 104 to an unsaturated monomer 112 having a carbon double bond creates a polymer chain 114 radical. In a further propagation reaction 116, the polymer chain radical 114 reacts with another unsaturated monomer 112 to create a longer polymer chain radical 120. A termination reaction occurs when a polymer chain radical of chain length n 124 reacts with another radical, including, but not limited to, an oxygen radical 104 as shown in FIG. 1, to form a stable polymer chain of length n 124 without any free radical.

Accumulation refers to polymerization by either condensation or by addition, and either method of polymerization can benefit from the microwave accumulation process. Addition polymers can acrete with no favored step size, and in some implementations contain only carbon in the chain or molecular "backbone". In polymerization by free-radical addition reactions, after the initiation step, free-radical monomer units can be added or accumulated in a step-wise fashion so that the average chain size within the reaction mixture increases by a repeat unit of addition until the entire mixture contains largely polymer with little or no monomer left. Here, another atom other than carbon, such as oxygen, can be incorporated into the lengthening chain. In one example, lactic acid can be polymerized into poly lactic acid (PLA). Polymers typically produced by accumulation of monomers using a step-wise free-radical process are called condensation polymers, and include the polyamides, polycarbonates, polyesters, natural polyesters and polyurethanes. In some implementations, it can be advantageous to prepare a pre-dispersed mixture of pre-polymerized pellets containing nano-particles in a masterbatch containing low-molecular weight polymer with short chains that may be incorporated into an extrusion process with added monomer at a production facility. Diffusion of the monomer into the masterbatch can then react with the polymer to provide a final product with desirable long chains. In this manner, the burden on the production facility can be relieved of quality control concerns about maintaining a complete dispersion.

Figure 2:
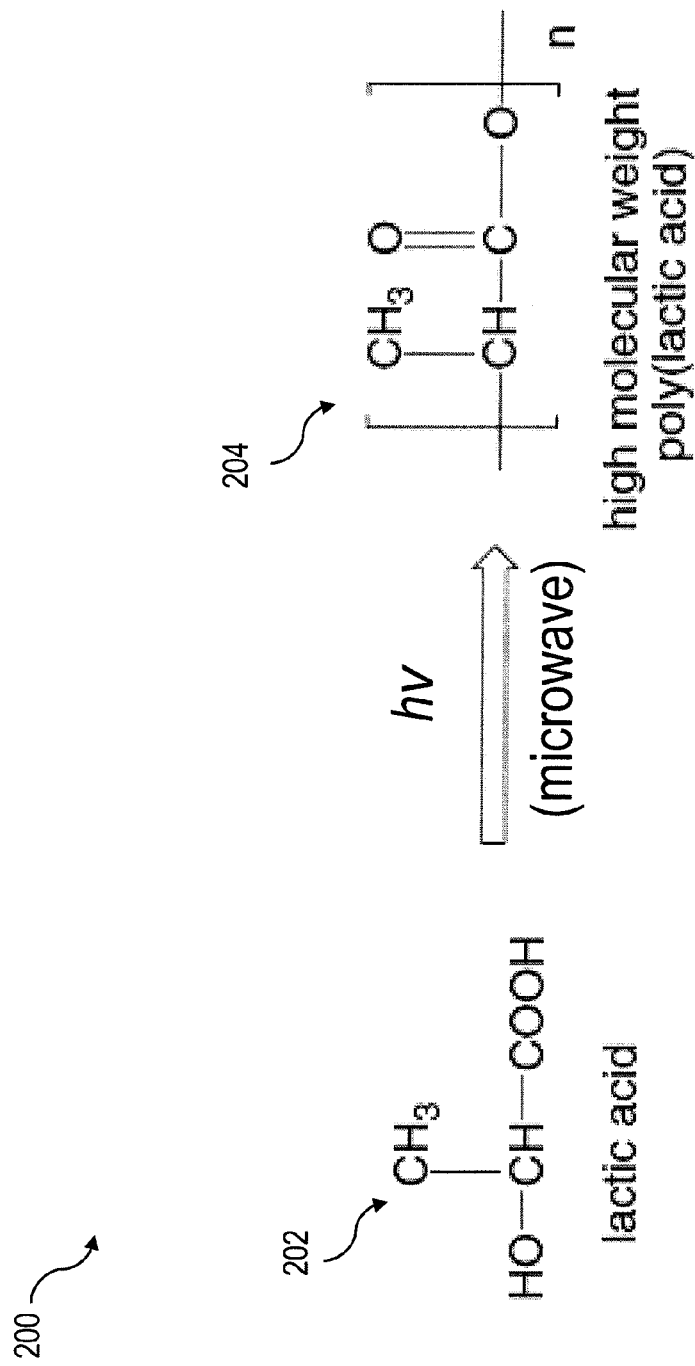
FIG. 2 is a reaction diagram illustrating microwave-initiated free radical polymerization of lactic acid to form polylactic acid.
Figure 3:
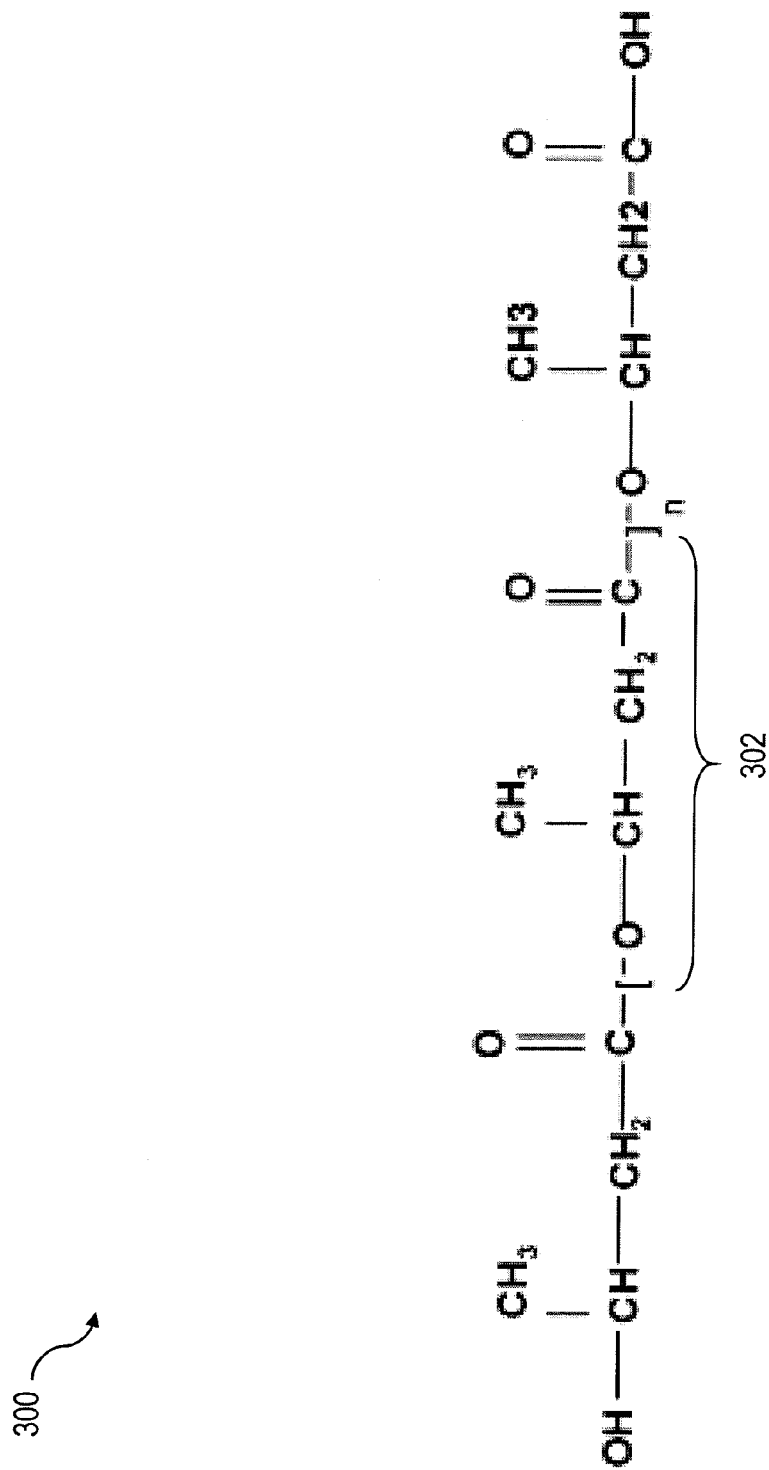
FIG. 3 is a molecular diagram illustrating a polymerized molecule of polyhydroxybuterate (PHB)

The reaction diagram 200 of FIG. 2 shows microwave-initiated free radical polymerization of lactic acid to form poly-lactic acid (PLA). The lactic acid molecule 202 undergoes conversion to a carboxyl free radical by breaking of the oxygen and hydrogen bond of the carboxylic acid group. This carboxyl free radical can react with another lactic acid monomer molecule to form a polymer chain and water. FIG. 3 shows a structural diagram 300 of a polymerized molecule of polyhydroxybutyrate (PHB). The repeating structural unit of the polymer chain 302 is shown in brackets, with the subscript n denting the number of repeating units.

Figure 4:
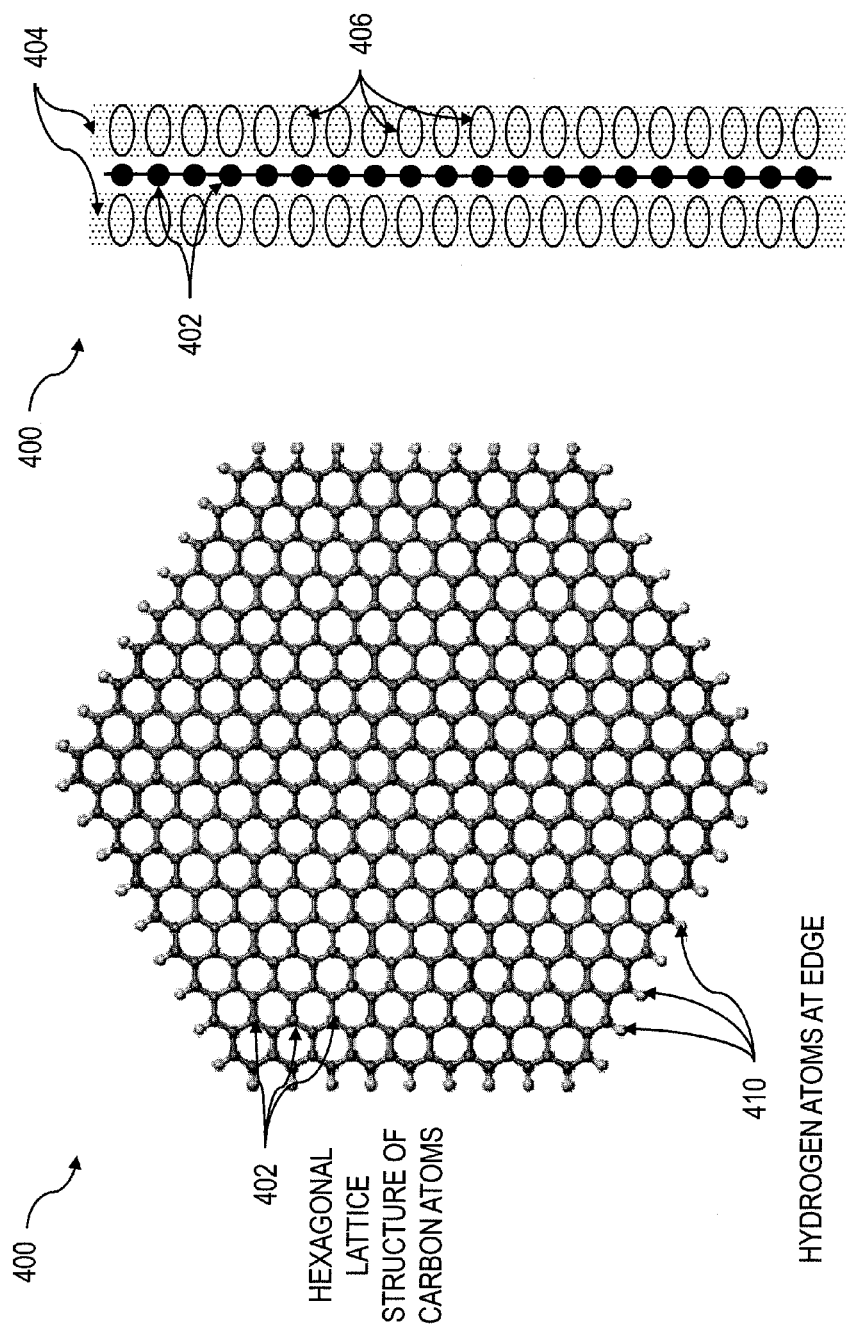
FIG. 4A and FIG. 4B are schematic diagrams showing planar and edge views of an example of a graphene molecule.

FIG. 4A and FIG. 4B show planar and edge views, respectively of a graphene molecule 400. The planar view of FIG. 4A illustrates the carbon lattice structure of a graphene molecule. Graphene is generally a one-atom-thick planar sheet of carbon atoms 402 that are densely packed in a honeycomb crystal lattice. Graphene is the basic structural element of several carbon allotropes including graphite, carbon nanotubes, and fullerenes. The carbon-carbon bond length in graphene is generally approximately 0.14 nm, and is formed by $sp^2$ bonds between carbon atoms 402, which are similar to those of all aromatic compounds such as benzene and its multi-ring polycyclic aromatic hydrocarbon (PAH) analogs, such as for example phenanthrene and anthracene. Each carbon atom 402 also contributes two p-orbital electrons to a delocalized m-electron cloud 404 on either side of the molecular plane that are formed by overlap of the p-orbitals 406 of each carbon atom that are directed perpendicular to the plane of the molecule 400. The outer edges of the graphene molecule 400 can include carbon atoms that are $sp^2$ bonded to hydrogen atoms 410.

Graphene molecules 400 can accept or donate relatively large numbers of electrons because these charges are distributed among the plane of their structures in two dimensions, wherein this wide spatial charge separation allows significant and substantial distribution of charge in space. The high charge accumulation acts to suspend and separate single graphene particles from their neighbors in dielectric fluids or monomers.

Use of exfoliated graphite (graphene) nano-particles that are not compacted prior to incorporation into the polymer can produce a very low permeability—in some cases the lowest possible with carbon filler based barrier materials. To achieve such low permeability, it can be advantageous to control the orientation, concentration, and dispersion of graphene nano-particles in the polymer. One currently commercial available, graphene feedstock known as nano-graphene platelets (NGP, available from Angstrom Materials LLC of Dayton, Ohio) generally includes between 1 and about 100 atomic layer thickness sheets and can, on average have an average thickness of about 10 to 15 atomic layers. These and similar graphene sheets can have chemical and adsorptive features allowing good chemical bonding to a range of resins that enables tailoring of composite properties; facile formation of reactive oxygen, sulfur, and nitrogen sites on graphene plate edges or surfaces; and high adsorptivity for organic materials. Even thinner graphene layers, for example smaller than 1 nm in thickness, are likely to be commercially available in the near future.

Implementations of the current subject matter can include the use of microwaves to act on charged nano-particulate feedstock materials to provide free radicals on the external nano-particle surfaces that are capable of reacting with the chemical substance of solvents and monomers that are included in a mixture into which the nano-particles are placed. The nano-particles can thereby be more fully expanded, dispersed, and separated.

Free-radical reaction features of the current subject matter can be distinguished from existing thermal reaction methods in part because the use of a free-radical initiation allows a more reactive process to take place preferentially at generally lower temperatures, thereby allowing monomers and nano-particles to accumulate rather than degrading and oxidizing them. A brief exposure to UV light can be used to initiate reactions according to the current subject matter. The accelerated reaction can be propagated on surfaces of the microwave-opaque particles by heating of both the particles and free-radicals in direct contact with or physically adsorbed on the nano-particles. Heat and electrons can be conveyed to and from the graphene nano-particles by the interposition of titanium dioxide. Titanium dioxide valence bands can readily transfer mobile electrons and allow them to fall into lower energy states of the conduction bands, especially at external surfaces. Because graphene may not attract polar molecules, and because titanium dioxide is a polar substance that attracts polar molecules such as monomers or polar solvents best able to accept or donate free radicals, the transfer of electrons and free radicals can be catalyzed by the presence of the titanium dioxide.

When microwaves interact with organic conductive particles such as graphene, those particles can react by moving charges from one end of the particle to the other end of the particle, much in the way that an antenna coverts radio waves to alternating current in a wire, so that the ends or edges of the electrical conductor of a proper length obtains a maximum of opposing charges. Examples of conductive nano-particles can include hematite ($Fe_2O_3$), carbon nanotubes or C-60 buckminsterfullerene, graphene, graphite, and amorphous carbon pigment. When microwaves interact with conductive particles, those particles can be heated due to resistive heating, and a chemical reaction can preferentially cause accumulation of nuclei to start at the hot surface of that particle. Additionally, a temporary charge imbalance can cause local negative regions at one end of the particle, while local positive regions are created at the opposing end of the particle. Monomeric molecules or free floating nano-particles can react more efficiently with a hot surface to accumulate in regions expressing a positive charge density, while others can accumulate with a hot surface expressing a negative energy density. Chemical accumulation can accelerate at points where molecular alignments are optimized, and at times when the charge densities are optimized.

Figure 5:
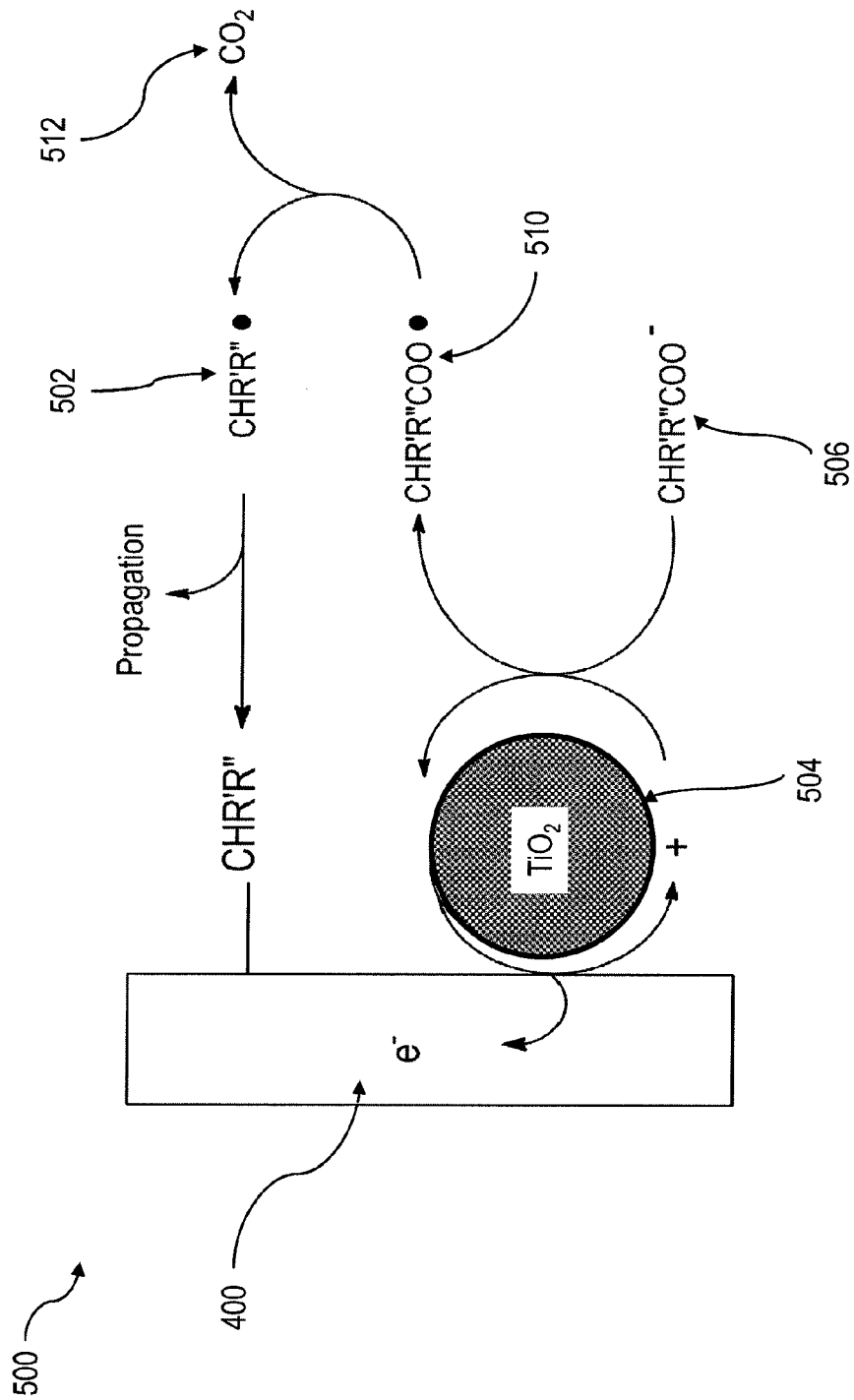
FIG. 5 is a reaction process diagram illustrating accumulation of a radical onto a graphene surface in which titanium dioxide donates an electron transferred to the graphene.

FIG. 5 is a reaction diagram 500 illustrating an example of the accumulation of an alkyl radical 502 onto a graphene molecule or grouping of graphene molecules 400. A titanium dioxide ($TiO_2$) nano-particle 504 participates in the accumulation of an alkyl radical 502, such as for example the alkyl radical as shown in FIG. 5, to a polymer chain by accepting a transfer of an electron from the graphene molecule 400. The illustrated electron extraction can occur without ultraviolet or other electromagnetic irradiation to propagate free radical reactions on the surface of titanium dioxide nano-particles 504, which can in some examples have effective diameters as small as 3 nm. The extra electron can be exchanged from the $TiO_2$ nano-particle 504 to an organic acid anion 506, such as for example acetate as shown in FIG. 5, to generate a carbonyl radical 510. The carbonyl radical 510 can decompose to form carbon dioxide 512 and an alkyl radical 502. This reaction can advantageously occur in the dark (for example, without the aid of UV light) and also in regions of graphene that are positively polarized with electron depletion (holes) due to the polarizing effect of microwave irradiation.

Figure 6:
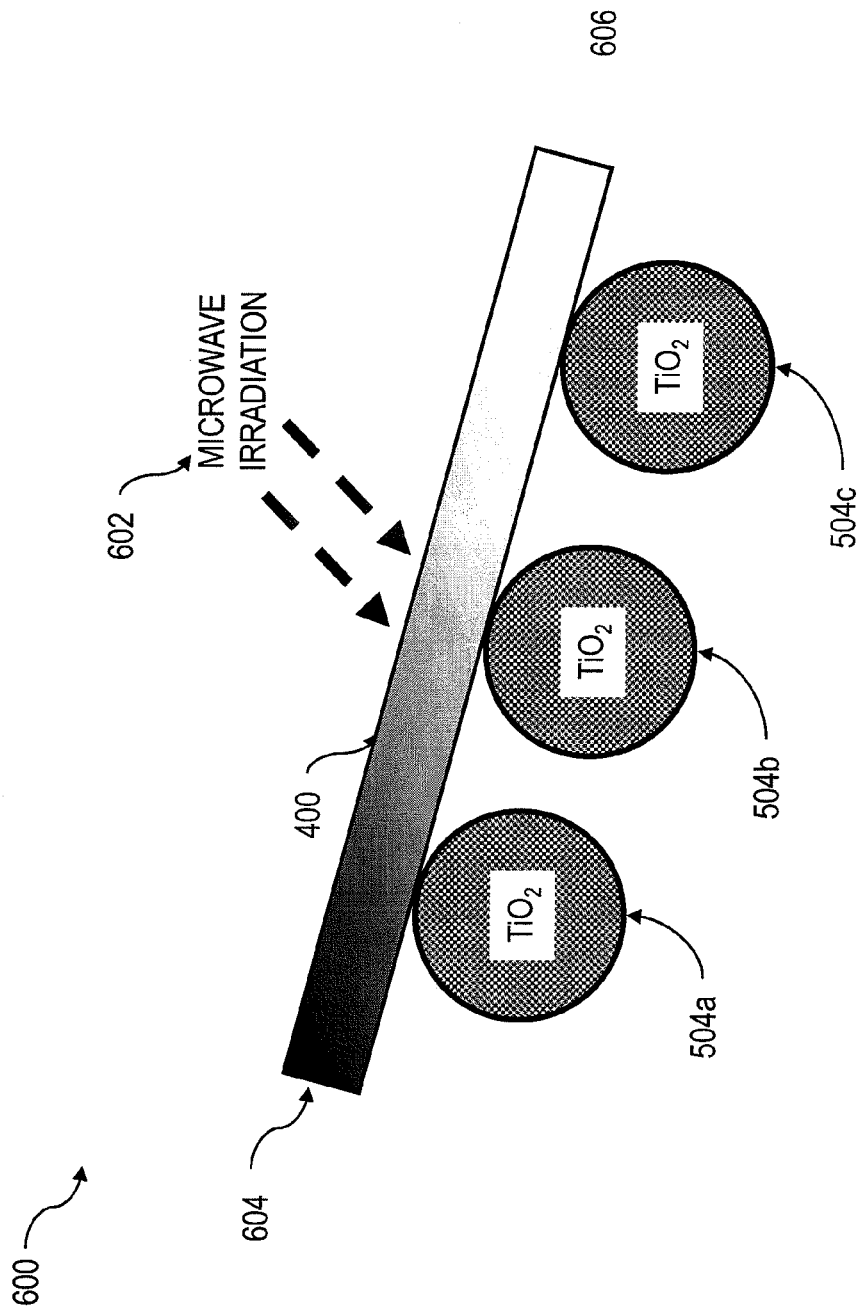
FIG. 6 is a schematic diagram illustrating polarization of a graphene surface into electron rich and electron depletion (holes) regions, using microwave irradiation.

FIG. 6 is a schematic diagram 600 illustrating an effect of polarizing a graphene molecule 400 (or an abutted series of such molecules) by microwave irradiation 602. Graphene 400 can both provide an electron and extract and accept an electron. In FIG. 6, the graphene molecule 400 is viewed edge on with the plane of the molecule 400 perpendicular to the plane of the image. An induced electron current can be created between the edges 604, 606 of the graphene molecule 400 by exposure to the microwave energy 602. A multiplicity of holes of positive charges can thereby be created due to the absence of electrons along a first edge 604 of the graphene molecule 400. A second, opposite edge 606 is thereby momentarily provided with a multiplicity of negative charges. In a manner analogous to an antenna, the graphene molecule 400 can thusly continue to accept electromagnetic energy. Alternating phases of the energizing radiation 602 can induce a current in the graphene molecule 400 resulting in a periodic reversal of the charge distribution along the plane of the graphene molecule 400 such that the first edge 604 becomes negatively charged and the second edge 606 becomes positively charged. FIG. 6 also shows particles of titanium dioxide 504a, 504b, 504c abutted to a planar side of the graphene molecule 400. In the situation illustrated in FIG. 6, the central titanium dioxide particle 504b can be less induced to accept or contribute electrons from its valence band into and out of the graphene molecule 400 because it is not as adjacent to the polarized outer edges 604, 606 of the graphene molecule 400. The other two titanium dioxide particles 504a, 504c, which are closer to the edges 604, 606, can be more induced to provide either positive or negative free-radicals into a surrounding solution of reactants upon exposure to microwave electromagnetic radiation. Graphene 400 can act as both an electron source and an electron sink with nano-particulate titanium oxide catalysts 504a, 504b, 504c acting as a mediator to the free radical formation in either capacity. The generated free radicals can subsequently participate in the accumulation of polymer molecules in the surrounding medium.

Figure 7:
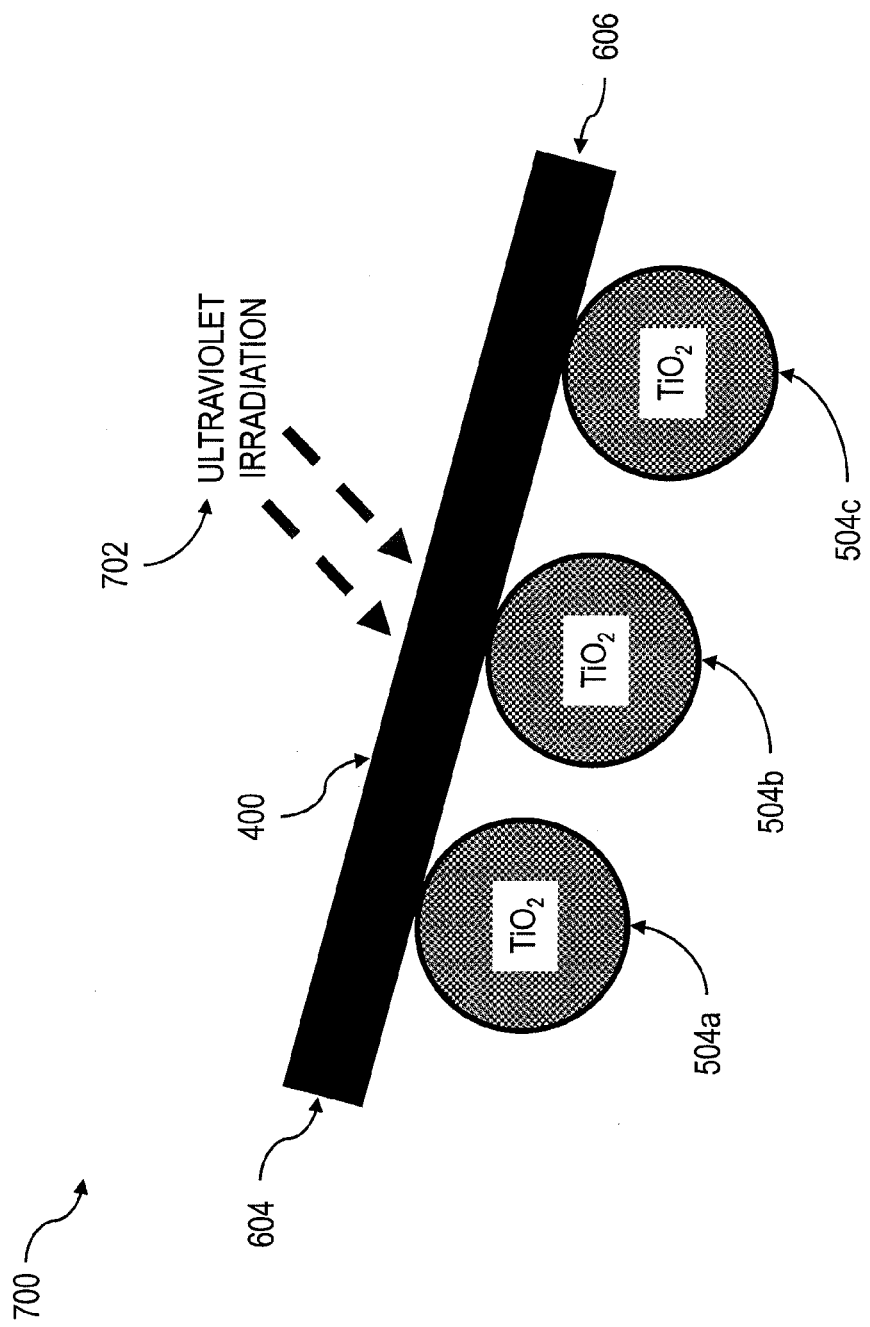
FIG. 7 is a schematic diagram illustrating excitation of a graphene surface using light irradiation where the entirety of the graphene regions contain a substantially uniform distribution of electrons and energized electrons.

FIG. 7 is a schematic diagram 700 illustrating an effect of exciting a graphene molecule 400 (or an abutted series of such molecules) by irradiation with light, e.g. ultraviolet light, visible light, and the like) 702. Negative charges can be expressed from the graphene molecule 400 from any edge (i.e. 604, 606, etc.) and at any exposed surface. These electrons are then capable of being transferred to titanium dioxide particles 504a, 504b, 504c associated with the graphene molecule 400. Polymer and monomer molecules adsorbed to the titanium dioxide nano-particles 504a, 504b, 504c then are able to react with the available electrons to create free radicals in a free radical polymerization initiation step such as that described above in relation to FIG. 1. The generated free radicals may then propagate in the surrounding fluid and solid media to allow accumulating reactions, such as for example those described above in relation to FIG. 1. In some cases, where the UV radiation is very intensive, and where surface moisture is present in the environment, hydroxyl free radicals can be generated and can act to oxidize and destroy the surrounding polymeric medium. This process can shift the direction of the reaction from accumulation to degradation. If the surrounding medium contains living bacteria, these bacteria can be destroyed due to the rupture of cell walls due to disruption and reaction with free radicals. When the intensity of the UV reaches an even higher level, the graphene molecule or molecules 400 can become oxidized and degraded. Nearby polymers can also become oxidized and degraded. Degradation can occur in some cases by chemical conversion to water, carbon monoxide, and carbon dioxide.

Figure 8:
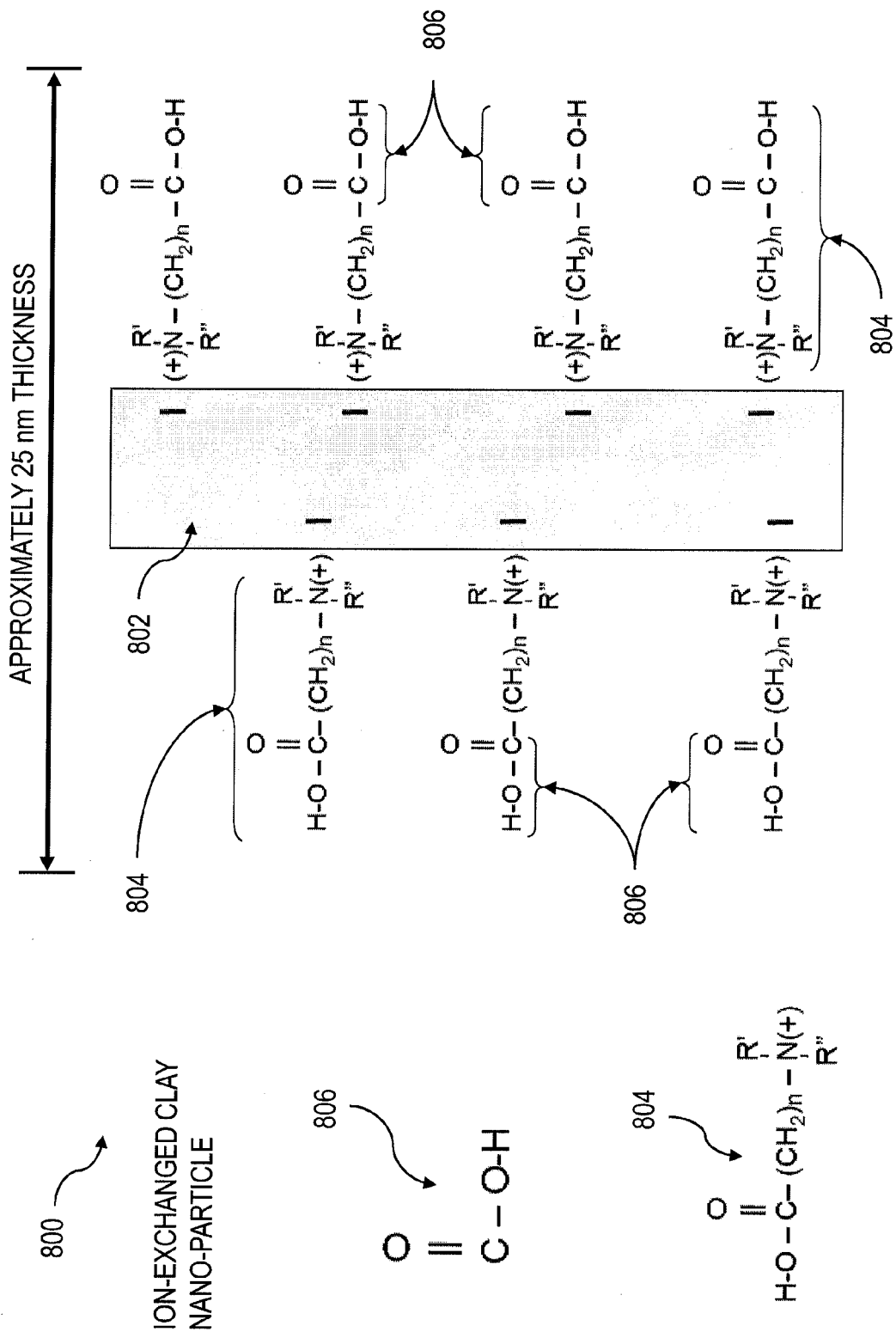
FIG. 8 is a schematic diagram illustrating an example of an organic ion-exchanged clay nano-particle.

FIG. 8 shows a schematic diagram of an ion-exchanged clay nano-particle 800 that can in some implementations have a thickness of approximately 25 nm. The clay nano-particle 802 can provide negative ion sites that, in a natural clay particle, can be associated with ions of alkali metals or alkaline earth metals (for example from Group I and Group II of the periodic table) as well as with other positive ions. In the ion-exchanged nano-particle 800 shown in FIG. 8, these negative ionic sites are ion-exchanged with positively charged organic ions 804, which as shown in FIG. 8 can be ternary alkonium cations, that include polar functional groups, such as for example the carboxyl (COOH) groups 806 shown in FIG. 8. Other polar functional groups, such as for example hydroxyl groups, amino groups, and the like, can also be included in ion-exchanged organic ions.

The carboxyl end group 806 (—COOH) of the alkonium ions 804 that are ion-exchanged on the clay nano-particle can participate in free radical formation in a similar manner to the carboxyl group of lactic acid as described above. The alkonium or other ion-exchanged organic molecule with a carboxyl group 806 can accumulate and extend the natural polyester chain out from the exposed clay at that site due to free radical addition, thereby extending an accumulated polymer from the clay nano-particle surface. A similar accumulated chain may extend out from a grapheme molecule or nano-platelet 400 or a $TiO_2$ nano-particle 504. In such cases, the polymer accumulated graphene can be described as a co-graphene, the polymer accumulated clay can be described as a co-alkonium cation-exchanged clay, and $TiO_2$ with accumulated polymer reacted to its surface can be described as a co-$TiO_2$. The network structure formed can combine linkages from any of these co-nano-particles as part of their structure, and can form novel compositions based on the ratio of starting materials, as well as the identity of the step-wise accumulated monomer.

Figure 9:
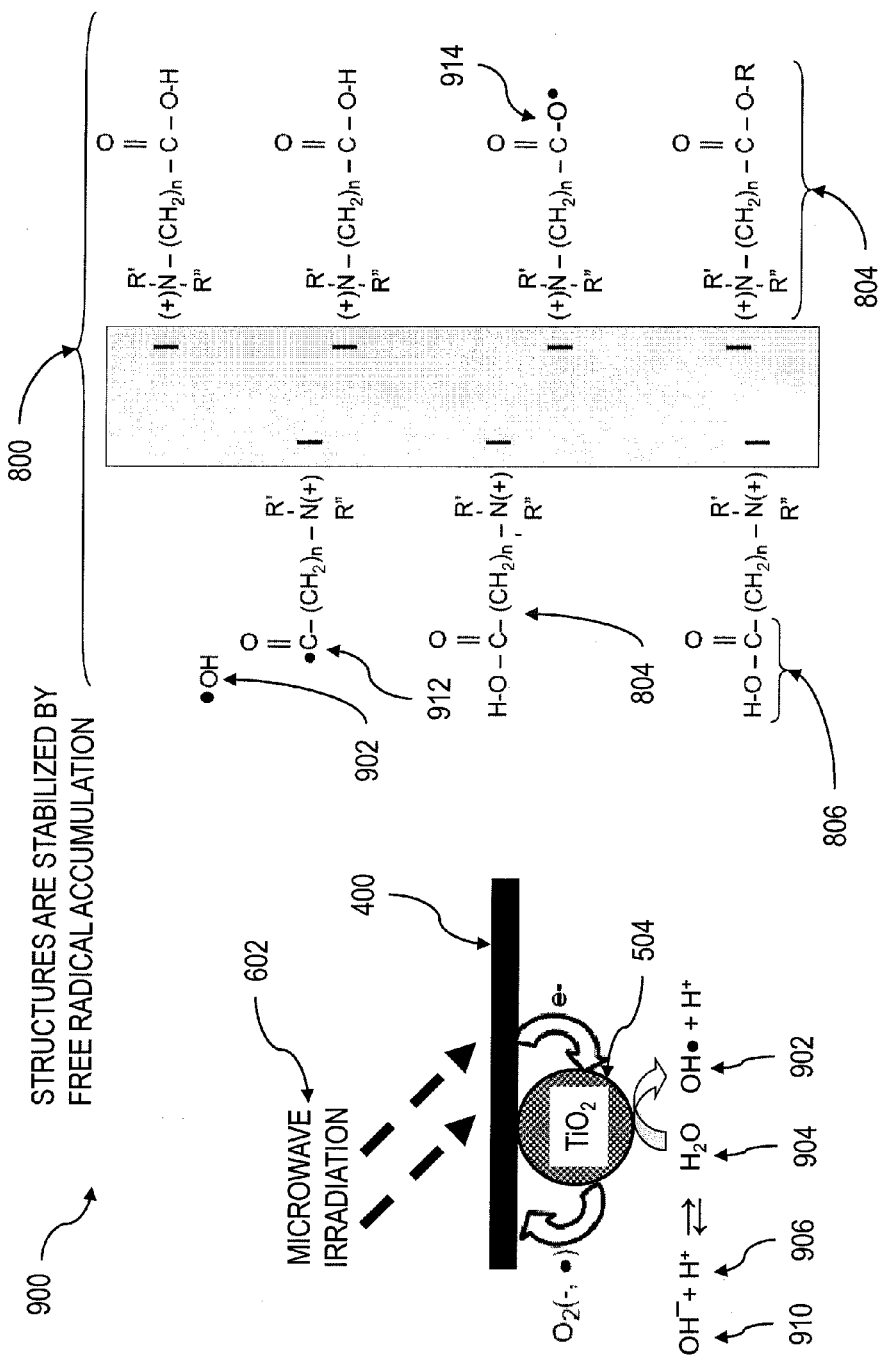
FIG. 9 is a schematic diagram illustrating microwave irradiation induced generation of free radicals from graphene-associated titanium dioxide nano-particles and interaction of the free radicals with an organic ion-exchanged clay nano-particle.

FIG. 9 illustrates a reactive system 900 including a $TiO_2$ nano-particle 504 associated with one or more graphene molecules 400 and an ion-exchanged nano-particle 800. Activation of the $TiO_2$ nano-particle 504 and graphene molecule 400 system with microwave irradiation 602 causes abstraction of a hydroxyl radical 902 from a water molecule 904, which exists in equilibrium with hydronium ion 906 and hydroxyl ion 910. Hydroxyl radicals 902 or other generated radicals can react with the carboxyl group 806 or other reactive site on an ion-exchanged organic ion 804 or accumulated polymer to form an organic free radical site on the organic ion-exchanged clay nano-particle 800. As shown in FIG. 9, an alkonium radical 912 (also known as an alkyl-ammonium radical) can be formed by abstraction of a hydroxyl (HO.) or alkoxy (RO.) radical from the organic ion 804. Alternatively, under co-polymerization reaction conditions with lactic acid, a hydrogen can be abstracted or removed from the organic ion 804 to form a carboxyl radical group 914. Also as shown in FIG. 9, the organic ion 804 can include one or more of carboxyl groups (HOOC—), ester groups (ROOC—), and other polar functional groups.

While FIG. 9 and the preceding discussion addresses hydroxyl radical as an initiator and participant in the free radical polymerization reactions, it should be readily understood that analogous reactions can also occur with alkoxy radicals, RO., where R is an organic molecular fragment as noted above. An organic peroxide (RO—OR'), alcohol (ROH), ester (ROR'), and the like can also participate in free radical formation in the presence of $TiO_2$ nano-particles 504.

Figure 10:
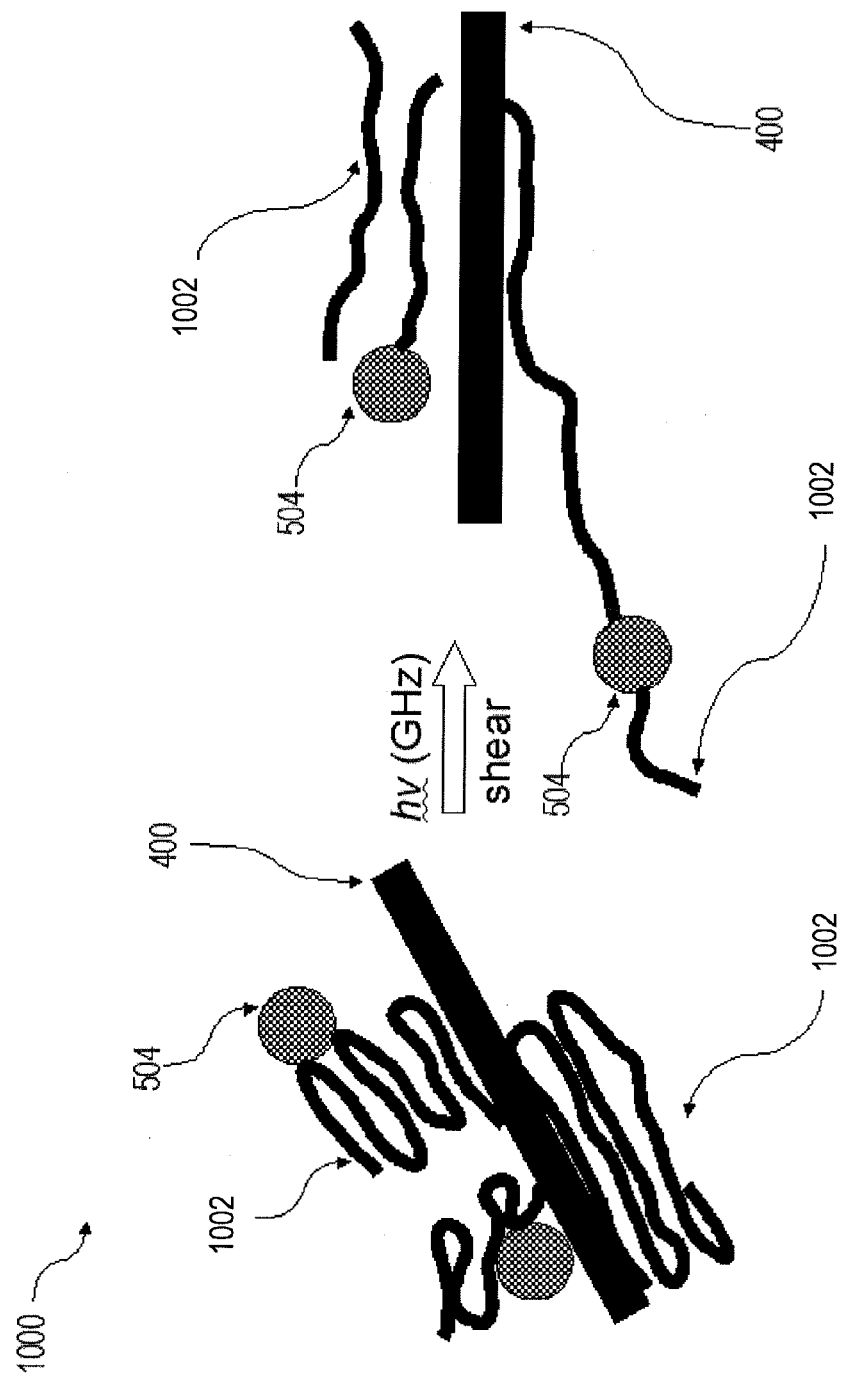
FIG. 10 is a schematic diagram illustrating a nano-particulate dispersion including graphene-nano-platelets, titanium dioxide nano-particles, and ion-exchanged clay nano-particles.

When microwaves interact with organic conducting nano-particles such as graphene, the electromagnetic energy can cause local heating and melting of polymer crystals. This energy of melt can be most effective near solid surfaces where crystals are most likely to nucleate. As shown in the schematic diagram of FIG. 10, a heterogeneous mixture of nano-particles of graphene 400, $TiO_2$ 504, and crystalline regions of accumulated polymer 1002 can be subjected to microwave irradiation and mechanical deformation, resulting in orientation of the high aspect ratio graphene 400 and elongational flow orientation of accumulated polymer units 1002 into the direction of mechanical deformation. This orientational change can be accomplished in a unaxial or a biaxial stretching operation.

Figure 11:
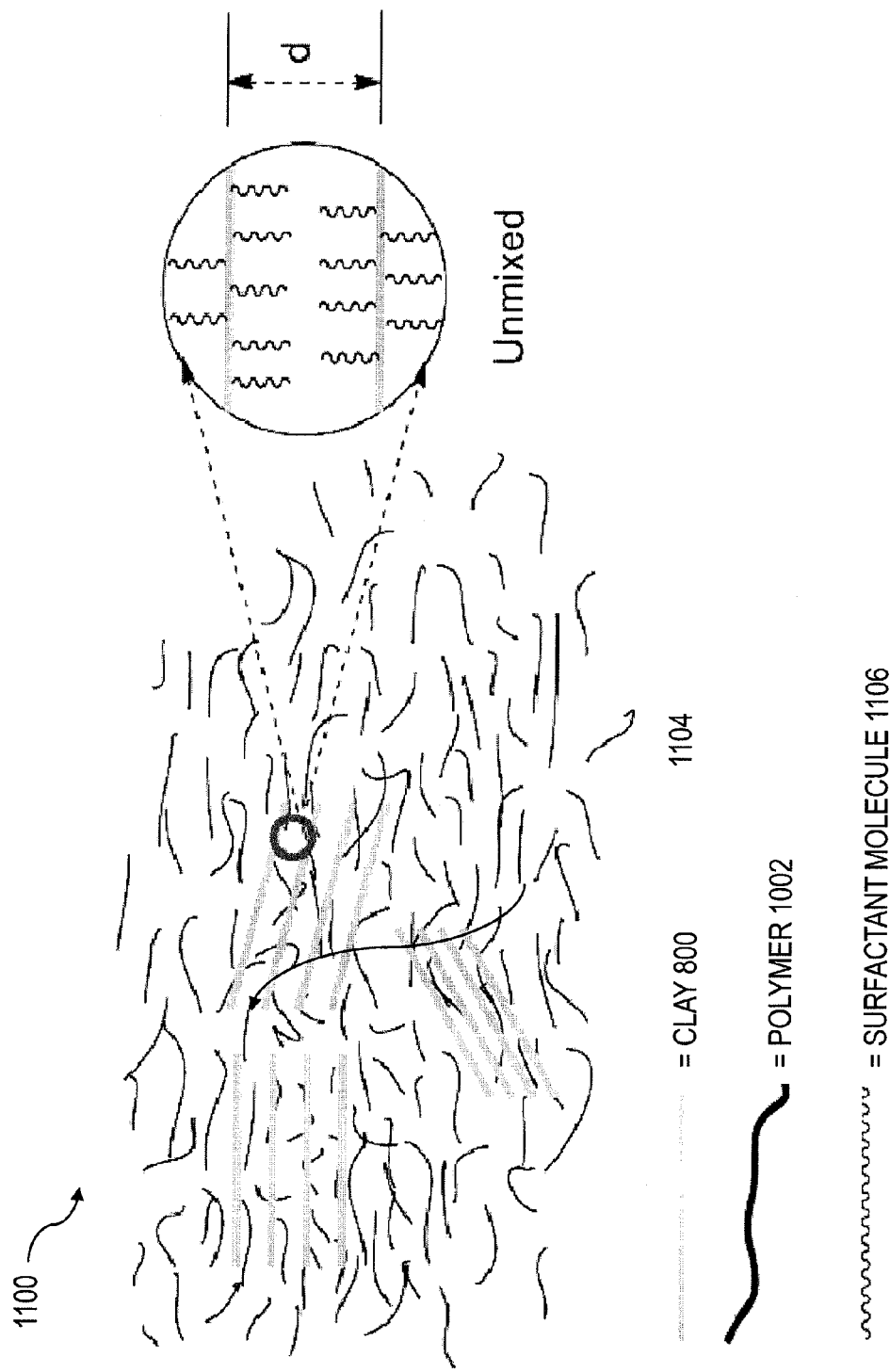
FIG. 11 is a schematic diagram illustrating clumping of clay particles in a conventional surfactant dispersion.
Figure 12:
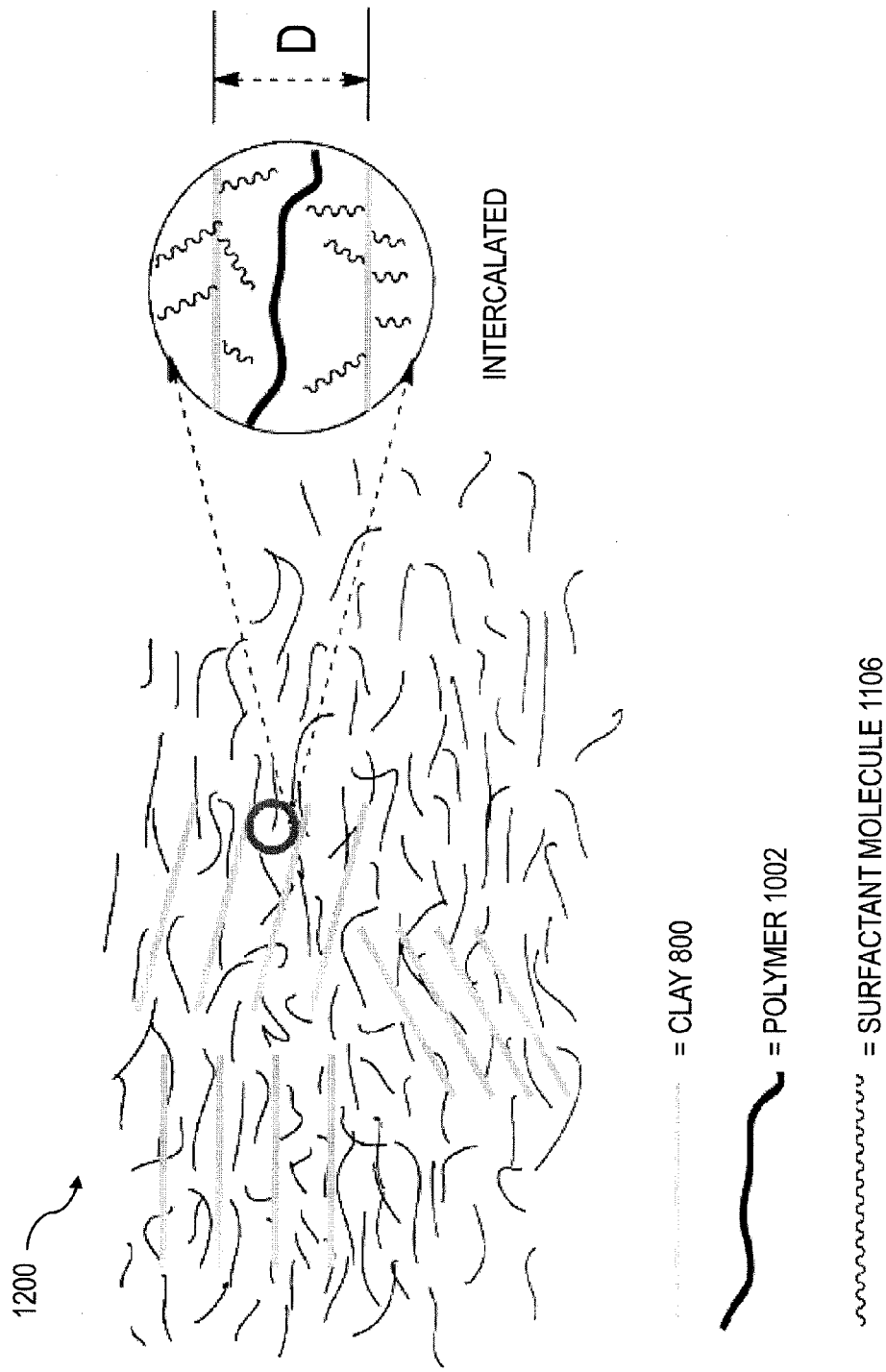
FIG. 12 is a schematic diagram illustrating intercalation of polymer units within a partially dispersed conventional surfactant dispersion of clay particles.
Figure 13:
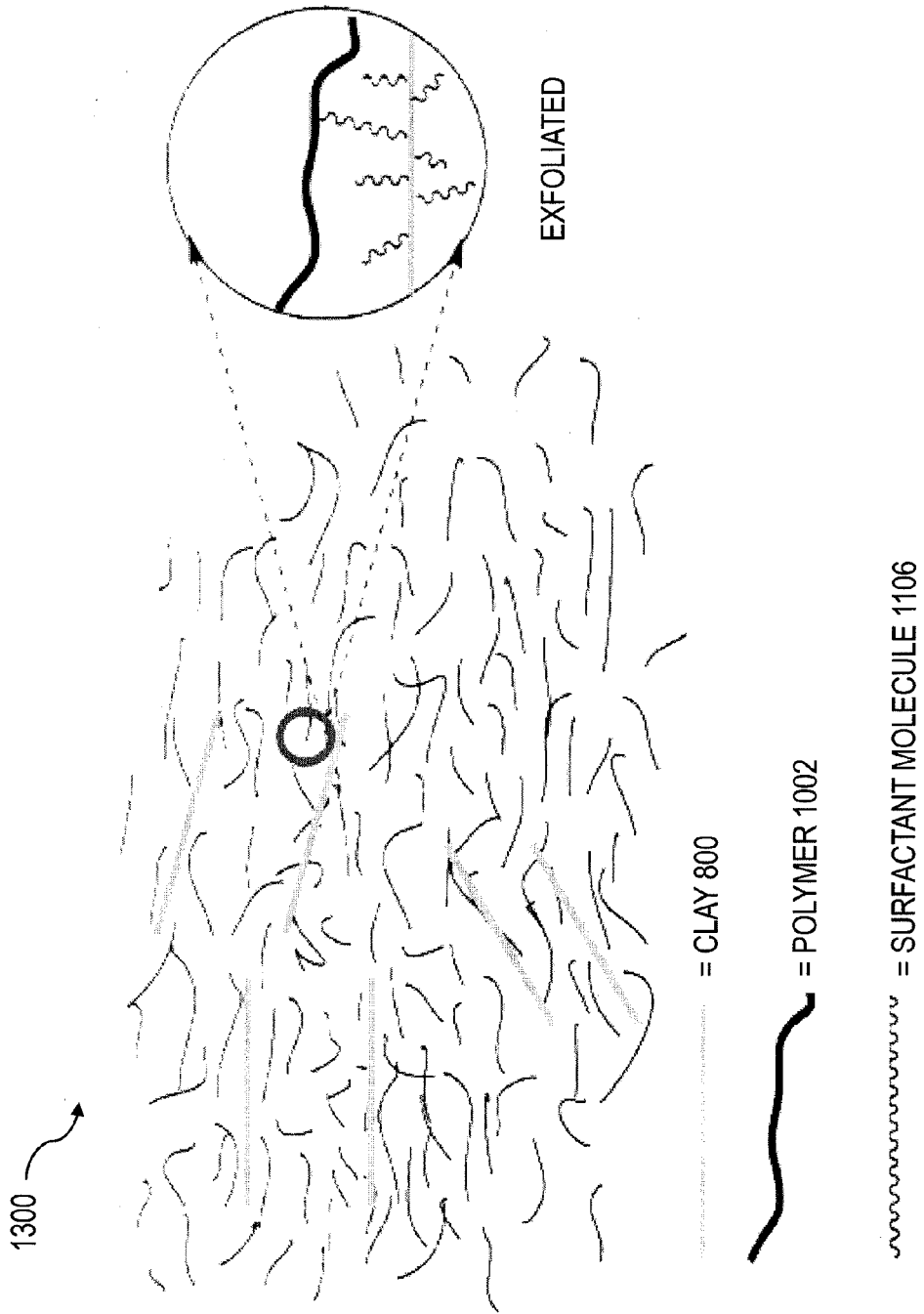
FIG. 13 is a schematic diagram illustrating the effects of bulk shearing forces on a conventional surfactant dispersion of clay particles.

FIG. 11, FIG. 12, and FIG. 13 show schematic diagrams 1100, 1200, and 1300 illustrating difficulties with previous approaches to dispersing nano-particles in a solution. As shown in FIG. 11, insufficiently sheared nano-particles of clay 800 can form clumped and layered sandwich structures 1104 with much of surfactant molecules 1106 associated with the clay nano-particle 800 being shielded from full interaction with polymer and monomer molecules 1002 in the fluid medium. In FIG. 12, while some polymer molecules 1002 may penetrate into or become intercalated within the clumped sandwich structures 1104 of the clay nano-particles 800, this process can fail to proceed to completion and therefore fail to disperse the clay nano-particles 800 throughout the resultant polymer material. As shown in FIG. 13, use of shearing forces to attempt to disperse the clumped sandwich structures 1104 can result in pulling apart of polymer bonds as well as those holding the clumped sandwich structures together. This can create a polymer with a substantially weaker tensile strength.

Small molecules can also orient in a microwave field. The orientation of small molecules such as monomers can cause them to position themselves near to an adjacent particle surface carrying a positive charge density, while others may position themselves according to a nearby particle surface with a negative charge density. Chemical accumulation can occur at the point when molecular alignment is optimized between transient or permanent charge expressed at a nanoparticle and the charge-oriented monomer when fictive and thermal energies contribute to optimized conditions for free-radical addition.

Figure 14:
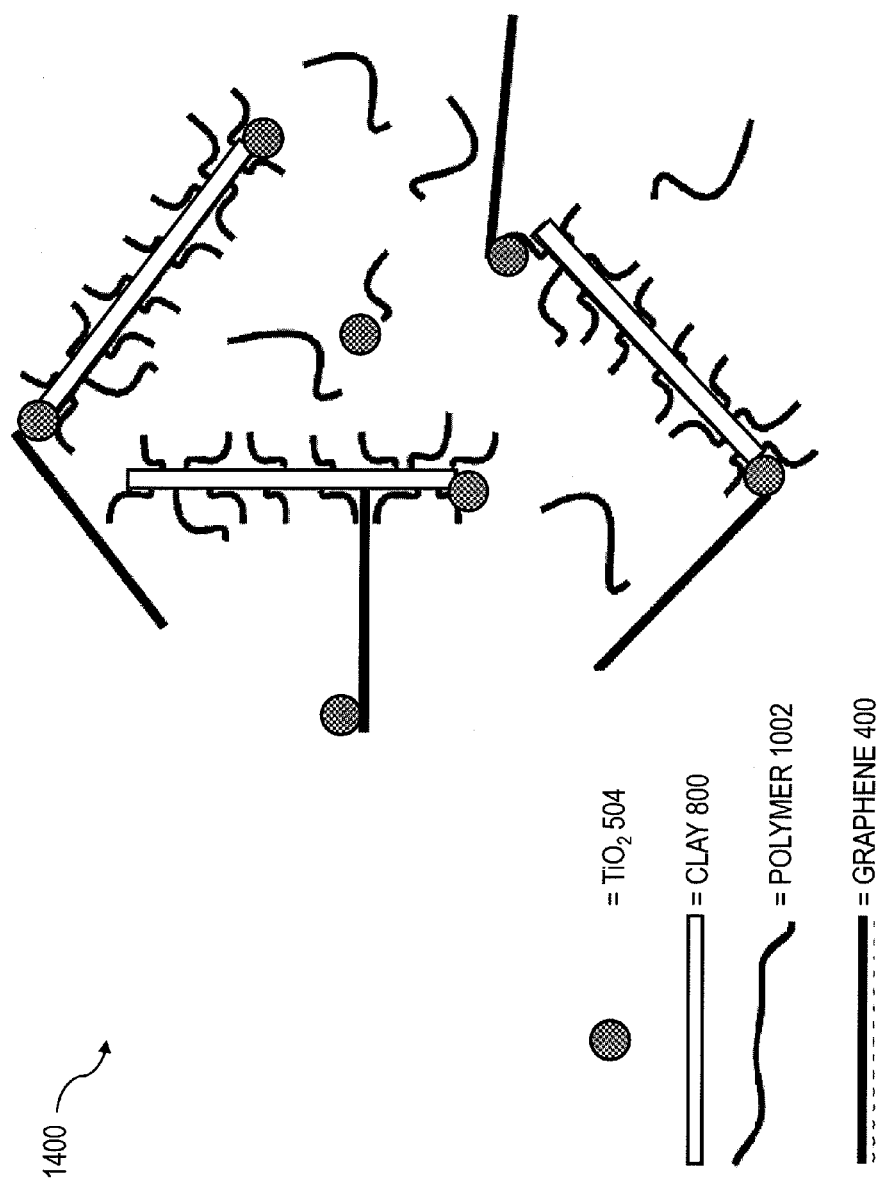
FIG. 14 is a schematic diagram illustrating a structure of a mixed nano-particulate dispersion including graphene-nano-platelets, titanium dioxide nano-particles, and ion-exchanged clay nano-particles.
Figure 15:
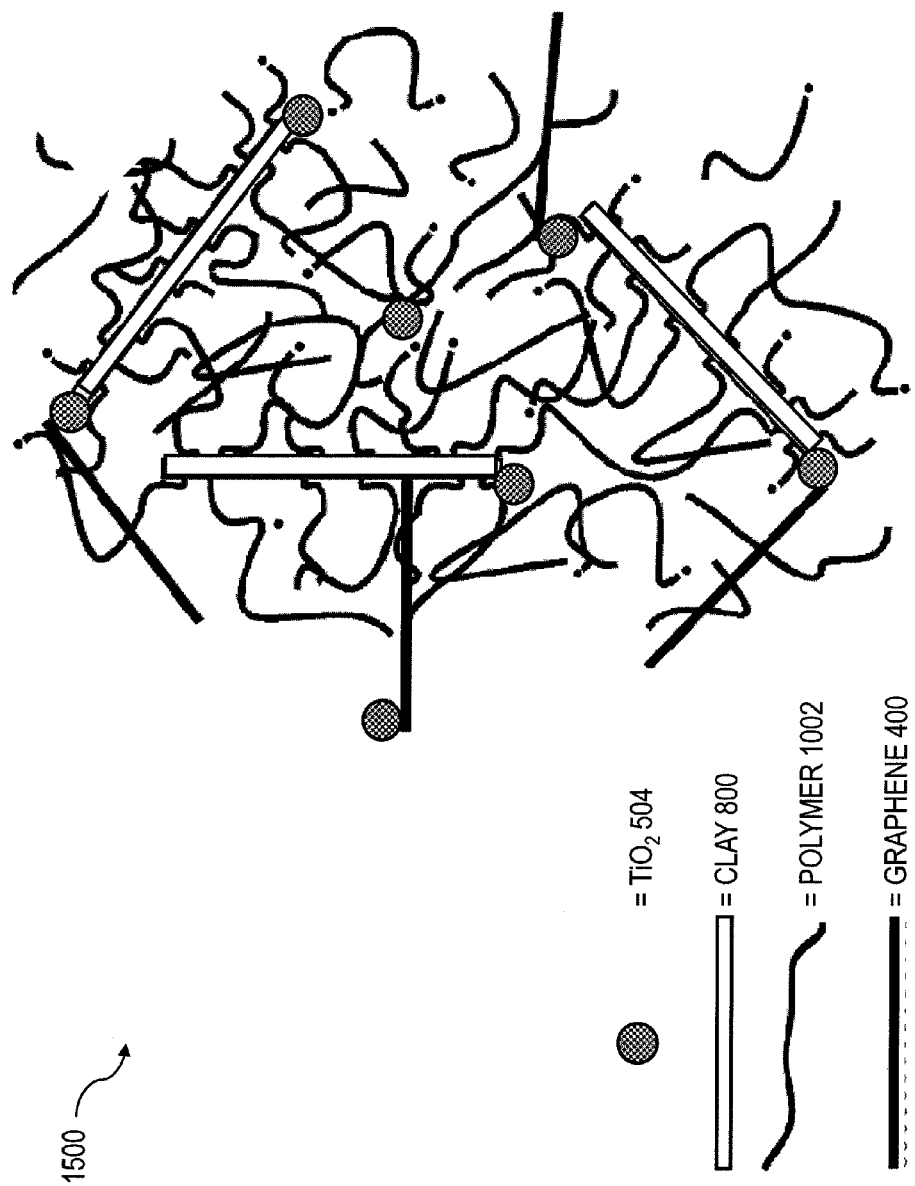
FIG. 15 is a schematic diagram illustrating free radical polymer and monomer units accumulating within a structure of mixed a nano-particulate dispersion including graphene-nano-platelets, titanium dioxide nano-particles, and ion-exchanged clay nano-particles.
Figure 16:
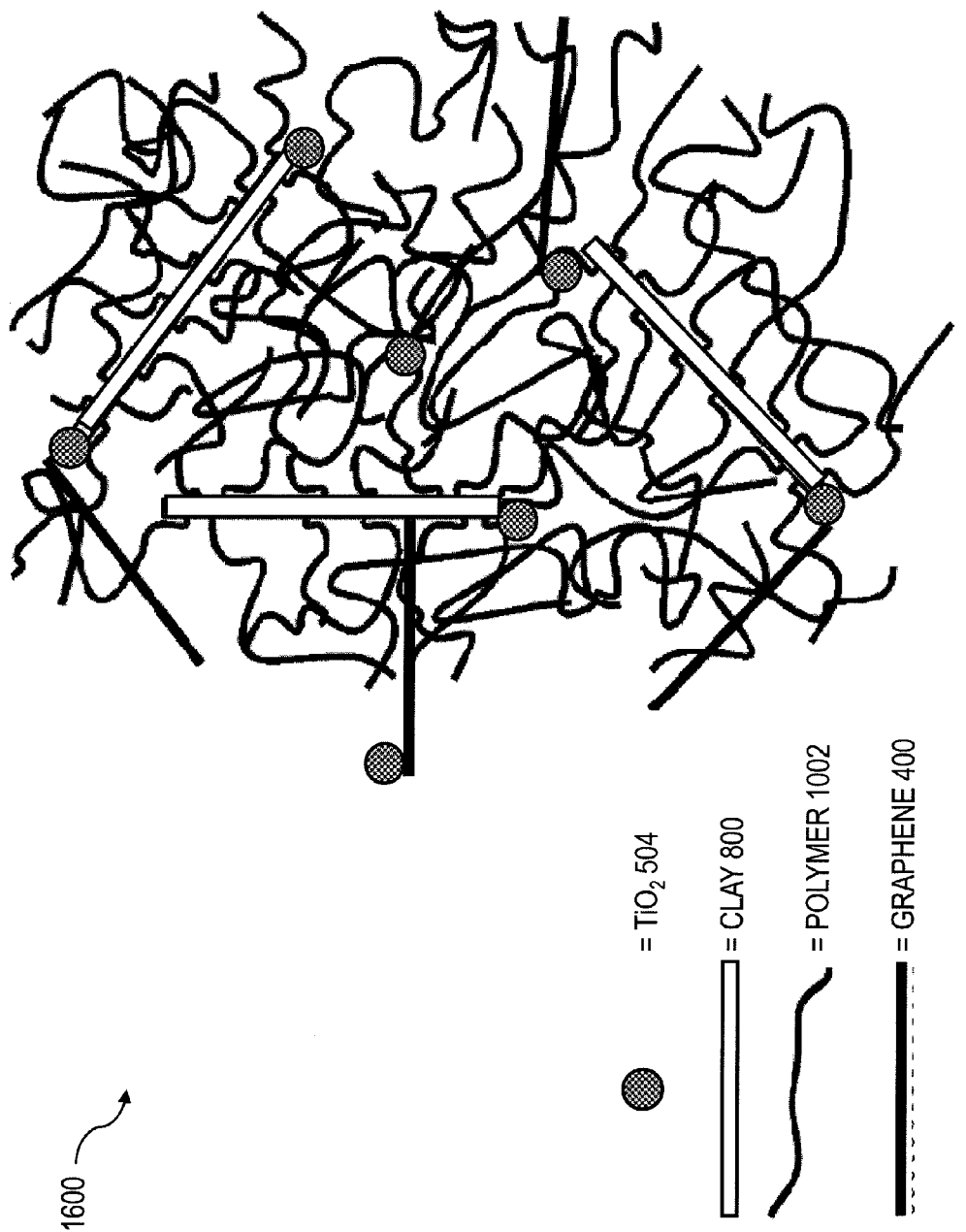
FIG. 16 is a schematic diagram illustrating a completed hybrid polymer structure.

As illustrated in the schematic diagrams 1400, 1500, and 1600 of FIG. 14, FIG. 15, and FIG. 16, respectively, the current subject matter provides superior dispersion of nano-particles throughout a polymer matrix while also increasing free radical generation in the working solution of polymer chains and monomers. As noted above, the additional free radicals can speed the polymerization reactions that form a polymer material and can lead to longer polymer chains as well as greater cross-linking with nano-particles that improves material strength, molecular orientability, and workability. FIG. 14 shows how electron exchange between graphene platelets or single molecules 400 and associated $TiO_2$ nano-particles 504 can initiate free radical generation which can be propagated and/or enhanced by irradiation with microwaves. Organic ion-exchanged clay nano-particles 800 can participate in ion-dipole interactions that lead to improved dispersion and mixing and can further enhance and propagate free radical polymerization reactions, both of attached organic ions 804 on clay particles 800 and on accumulated polymers 1002 in the solution. In FIG. 15, free radical polymer fragments and accumulated polymer units 1002 can accumulate near and are stabilized by free radical and polar functional groups on the organic ions 804 exchanged with the clay nano-particles 800. FIG. 16 shows the final polymer includes $TiO_2$ nano-particles 504, clay nano-particles 800, and graphene nano-particles and molecules 400 interspersed throughout a polymer matrix of both free and attached accumulated polymer units 1002.

Figure 17:
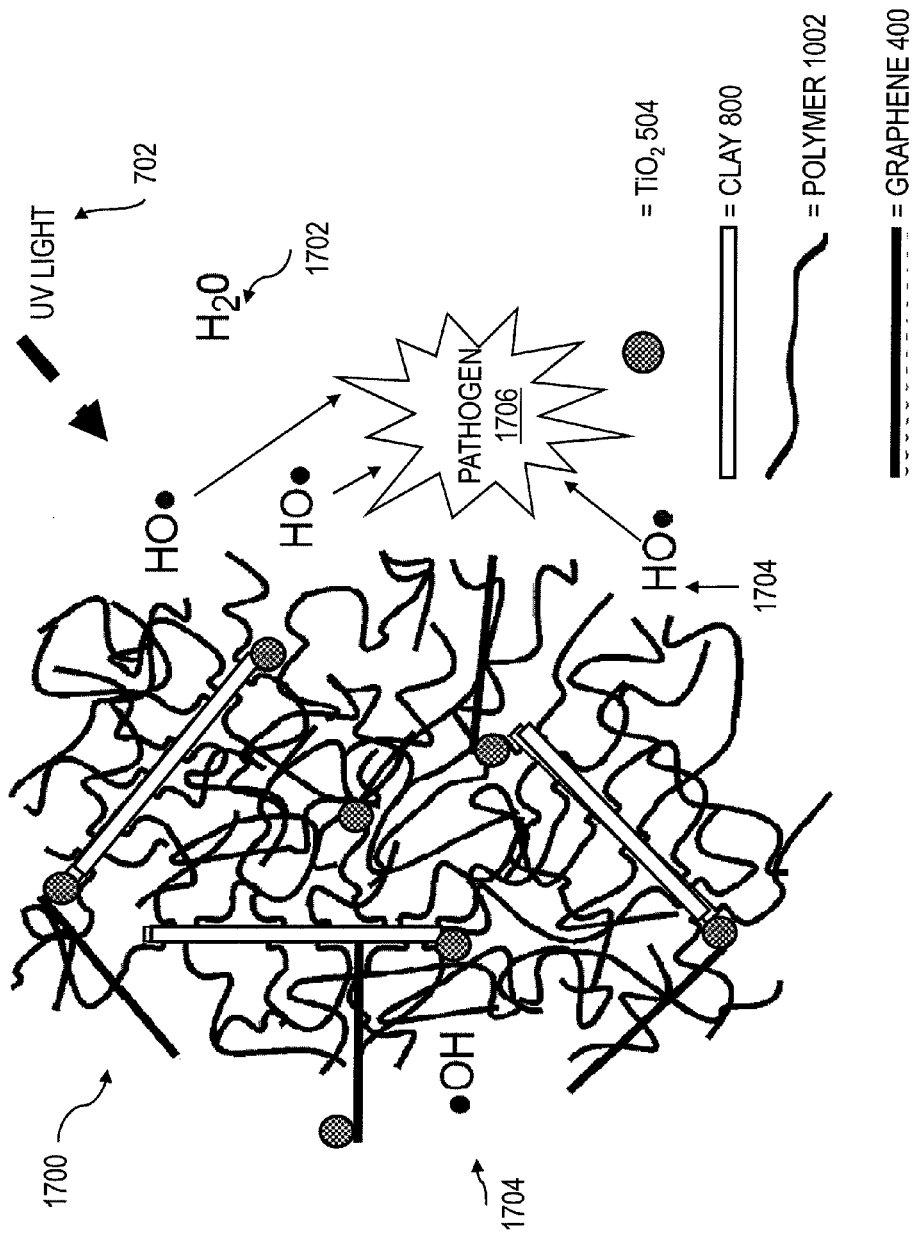
FIG. 17 is a schematic diagram illustrating free radical generation due to interaction with water and/or light for sterilization of materials stored in or near a hybrid polymer material.

As noted above, polymer materials according to various implementations of the current subject matter can demonstrate sterilization properties that can destroy or reduce the activity of bacteria, viruses, and/or other pathogens. An example of this process is illustrated in FIG. 17. Exposure of a hybrid polymer material 1700 containing dispersed $TiO_2$ nano-particles 504, graphene nano-platelets 400, and ion-exchanged clay nano-particles 800 to visible and/or ultraviolet light 702 or water 1702 can cause dissociation of polar groups of adsorbed moisture, the polymer material or other additives such as trace amounts of lactic acid monomer to create hydroxyl radicals 1704 and/or other radicals that can interact with a pathogen 1706, which can be a bacterium, a fungal spore, a virus or virus fragment, a mold, or the like. The free radical interaction can break a cell wall of a bacterium or otherwise destroy or deactivate the pathogen 1706 to reduce food spoilage and/or propagation of a disease or illness.

An additional feature of hybrid polymer materials consistent with the current subject matter is the ability to rapidly degrade upon activation of a degradation process. In general, the strength and resistance to degradation of a plastic polymer material is a function of the length of the intertwined polymer chains that form the plastic material. Thus, processes that cause breakage of bonds in a polymer chain tend to weaken the material and enhance its ability to further degrade. The various nano-particulate materials (i.e. $TiO_2$ particles, graphene nano-platelets or molecules, and ion-exchanged clays) that can be included in the hybrid polymer materials described herein enhance electron donation and acceptance interactions and free radical generation. Exposure to visible and/or ultraviolet (UV) light, for example at high intensity, can activate or accelerate these processes, especially in the presence of moisture, and thereby create an environment that is more conducive to destructive free radical spallation reactions that can break polymer bonds and weaken the tensile strength of the plastic material. Chainlike polymer molecules can thereby be decomposed into shorter and/or more polar molecular segments using exposure to relatively high intensity UV. The shorter segments are more soluble in water and more readily digestible by bacteria and are therefore available for composting into base molecules such as carbon dioxide and water. Some of the carbon from the polymer chains can also be incorporated into the bacterial structure and thereby remain sequestered from release into the atmosphere. The bacteria and small organisms that participate in composting are typically not capable of attacking the long polymer chains of currently available plastic materials.

One processing approach that can be used in implementations of the current subject matter can include dispersing the molecular-scale nano-particle reinforcements using dissolved oxygen gas in a monomeric fluid such as lactic acid of sufficiently low viscosity. The mobility of the molecular-scale nano-particles allows them to be aligned and therefore moved into position for further processing by the application of microwave process energy. Microwave irradiation heats the graphene sufficiently to substantially remove physically adsorbed (physisorbed) surfactants and surface impurities from the graphene molecules and nano-platelets. Chemically active regions of graphene can thereby be exposed and activated for free radicals to accumulate with the graphene.

Ultrasound can cause destruction of graphene and subsequent reformation of graphene byproducts into less desirable fullerenes or carbon nanotubes shapes with less expansive surface areas that are less able to form permanent covalent bonds with monomers and graphene radicals as described in various aspects of the current subject matter. Ultraviolet (UV) light can be useful in free radical addition chemistry of monomers. However, the presence of oxygen in the co-graphene adducts of some aspects of the current subject matter can actually make UV initiation less deisrable. For example, the use of ultraviolet light in exposures exceeding 5 minutes can, in some cases, excessively oxidize and cause permanent structural damage to graphene, which can produce a sufficiently oxidized graphene oxide intermediate with poor strength and poor moisture barrier properties to hinder generation of desirable properties in hybrid polymer materials according to one or more implementations of the current subject matter. This process can, however, is made useful by enhancing degradation of a used polymer material containing nano-particulate graphene. However, in initial processing of the material, this result may not be desirable.

Microwave radiation differs from conventional conductive heating because heat is generated in the material itself instead of externally. The dielectric properties which govern the rate of internal heating by microwaves vary widely in magnitude among the various constituents in materials. Typically, irradiated graphene nano-particles can be about 11 degrees C. higher than the temperature of a bulk fluid medium into which it is dispersed. Microwaves can energize specific bonds in molecules to enable reactions under conditions for which they would otherwise not occur. Additionally, application of microwave energy can minimize heating of the bulk material temperature but increase the local temperature in a charge-polarized part of a component where it is desirable to increase the rate of chemical reaction.

In implementations of the current subject matter, the various added nano-particles can be considered as chemical reaction vessels on a very small (nanometer) scale. Acceleration of chemical reactions and accumulations on the outside solid surface or between adjacent or abutting solid surfaces of these nano-particles can be enhanced by interactions with microwaves. Unique products and molecular and particulate orientations and arrangements can be created in the resulting composition, as compared to traditional reflux and convective conditions using similar starting components without the benefit of reactive nano-particle solid surfaces. The increasing pressure developed between the nano-particle reaction vessels can cause superheating of the monomers and solvents trapped between them. This state is generally not achieved or apparent in monomer or solvent outside of the nano-particle reaction vessels. In implementations of the current subject matter, microwave accumulation can lead to the bulk of the monomer (reactants) remaining cool and not subjected to excess or destructive heat until they move or are moved to find their proper place among abutting nano-particles or between nano-particles of a desired functional site and position that have been activated and energized by the localized action of the microwaves.

Mechanisms of energy transfer in microwave heating can occur by electric dipolar coupling of the radiation to permanent or induced dipole moments in the polymer, as well as in the irradiated nano-particles, rather than by thermal conductivity as in convective heating. Implementations of the current subject matter can provide self-assembled hybrid materials using monomer accumulation with nano-particles via two or more mechanisms. In the first, a charge induction of a conductive nano-particle can include a structure with mobile electric charges. In the second, a substantially non-conductive or insulating nano-particle can include a structure with fixed electric charges by orienting nano-particles of high aspect ratio in a favored direction by the inductive charge-coupling process. Separation of free radicals from their charged parent particles or molecules can be achieved by either electronic motion or by ionic motion, thereby creating a space-charge separation effect. These processes can allow irradiated nano-particles to accumulate uniquely functional hybrid composites either separately or together to form accumulated polymer-nano-particle hybrids. Fluid flow effects can be applied during these processes to achieve additional orientational and compositional control on the molecular scale.

Graphene nano-particles and/or ion-exchanged clay nano-particles as used in various implementations of the current subject matter can accelerate the rate of free radical addition, thereby removing the need to provide a traditional leachable catalyst in polymer processing. Non-leachability of these reactive solid nano-particles can be achieved by their participation in the reaction, for example by their incorporation as adducts to the monomer and polymer reactants. Because they participate in the reaction, the nano-particles in this case are not considered a catalyst, but are instead a catalyst replacement. Reactive $TiO_2$, ion-exchanged organo-philic clay nano-particles with carbo-cation functional groups, and graphene carbo-cation nano-particles can provide important reactive sites as well as orientational reinforcement in the production of polymer compositions. Charged carbo-cation radicals can be foamed in the presence of oxygen and a free-radical initiator. A type of carbo-cation radical can include a monomer, denoted R(+, .), capable of addition to like carbo-cations to form an accumulated polymer of type (+R—R+) adduct. Another type of carbo-cation radical can include a monomer, denoted R'(+, .), capable of an addition to like carbo-cations to form an accumulated polymer of type (+R'—R'+) adduct. Copolymers can be accumulated by the addition of unlike monomers such as a (+R—R'+) adduct.

Particle clumping can interfere with self-assembly of the desired nanocomposite material unless particles substantially fixed in space have charges in them that can be kept in a state of motion, or particles with fixed charges on them can be kept in a state of physical motion or displacement. In physics, both objectives can provide a state of dynamic flux. This method of avoiding clumping can be achieved according to various implementations of the current subject matter by one or more of irradiation with microwaves, creation of heat at a nano-particle surface due to resistive heating, creation of heat at a nano-particle surface due to displacement causing friction heating, and interposition of a functional chemical bond at a nano-particle surface.

Charge and motion effects can be optimized when electromagnetically irradiated nano-particles are oriented such that one or more particles, either singly or multiply when in contact, obtain a physical length in the path of the electromagnetic wave which substantially matches the wavelength or some whole number multiple of the impinging electromagnetic wavelength. This arrangement can provide a good match of the impedance of the applied radio waves for the purpose of transferring energy from the electromagnetic wave to the particle. Improperly aligned particles are generally less receptive to receiving optimal energies from applied radio waves to cause orientational (position) and charge density interactions. The combination of position, radio-frequency impedance matching, and heat energy can act together to afford each of the conditions that lead to directed-assembly and accumulation of nano-particles with accumulating monomers and accumulating nano-particles according to various implementations of the current subject matter. The likelihood of a good impedance match with nano-particles can be improved with stirring or reorientation of the nano-particulate regions of the composition into those orientations most favorable for the desired structures and electromagnetic interactions.

A typical microwave food processing frequency is approximately 2450 MHz (or 2.450 GHz). This frequency and others near it can be chemically sufficient to activate nano-particle accumulation processing and operation within internationally regulated environmental frequency provisions for exposure and safety provisions. In some implementations, an output power of 500 Watts can be used to avoid or reduce damage to the reactive systems in the polymer composition. Once the desired bulk reaction temperature is reached, a final continuous irradiation of, for example, approximately 40 Watts can be maintained to provide optimal reaction conditions. For natural bio-polyesters, this process temperature can be about 175° C., and can be monitored by an external probe, for example a fiber-optic sensor, for temperature measurement. Any sensor type can be selected such that process monitoring is transparent to microwaves so that the process, and not the sensor, contributes to the monitored heat energy for the purpose of the desired thermal feedback and control.

Implementations of the current subject matter can include nano-particle-bio-polymer compositions including homopolymer, copolymer and terpolymers which can provide increased shelf-life stability and integrity of the package to better preserve and protect the contents of the package. A further benefit involves slowing the degradability of the nano-particulate-biopolymer under package use conditions. Biodegradability can be activated on exposure to enzymes present in moist soils with organisms that are typically present in composting processes. Packaging material biodegradability and compostability can be selectively accelerated without the retarding or stabilizing presence of graphene. High intensity, high power light illumination, such as by UV-flash irradiation, can provide sufficient energy to preferentially oxidize the graphene dispersion into graphene oxide. Especially when such radiation is applied in the presence of moisture or trace amounts of moisture, the free radicals can further degrade the graphene and co-polymer in such polymer compositions to render the graphene substantially converted into carbon dioxide and water. This removal by conversion of graphene nano-particles and polymer can create voids and fractures that can enhance moisture diffusion and can generate a polymer with enhanced degradability after the free radicals have naturally terminated. Trace amounts of catalytic organo-philic clays can be added as part of the initial biopolymer formulation or composition. These organic-philic clays can include, but are not limited to Cloisite 20 clays provided by Southern Clay Products of Gonzales, Tex., or Nanomer clays provided by Nanocor, Inc., or an equivalent product sufficient to provide enhanced rates of biodegradability due to the establishment of a charged clay surface which attracts and anchors bacteria under moist growing conditions.

Heat sealing and orientational film processing can be enhanced by the nano-particle or mixed nano-particles dispersed and co-reacted with compositions according to one or more implementations of the current subject matter. Graphene and aluminosilicate clays can be susceptible to heating by microwave radio frequency energy. Application of radio-frequency energy normal to the plane of a film can result in heat energy emitted locally from the immediate vicinity of dispersed nano-particulate regions of the film. These regions constitute solid surfaces which have nucleated the crystallization of semicrystalline and crystalline polymers such as those found in most commercially available biopolymers. Excessive crystallization in biopolymers can be undesirable because it can interfere with film processing. Nano-particulate regions in a nano-composite film can therefore be used as processing aids when they are heated by microwaves in such a way that enhanced molecular mobility is achieved specifically in those crystalline regions of material in the production process that have nucleated close to the nano-particulate regions. Mechanical processing of the bulk of the film can be enabled due to the microscopic molecular scale melting of undesirable crystalline regions in the polymer contacting preferentially heated nano-particles. Catastrophic film failure during elongational mechanical processing can then be avoided during the stretching and forming operation. At some distance from the graphene in the film, polymer molecules can maintain the modulus and properties of amorphous regions of the polymer, thereby allowing mechanical load transfer to the bulk of the film. This combination of deformations and removal of crystalline inclusions enhances stretching and forming operations, especially when the film is irradiated by microwaves while being biaxially stretched in a blow-molding process.

EXAMPLES

The current subject matter can be further understood by reference to the following non-limiting examples.

In one such example, a premix of nano-particulate additives, such as those described above, can be mixed with commercially available polyhydroxybutyrate (PHB), polyhydroxyhexanoate (PHH), and polyhydroxyvalerate (PHV) copolymers such as p4001 sold by Metabolix, Inc. of Del. The mixing can include introduction at or before the exit of a last extrusion barrel of a single or double screw plastic extrusion machine, such that the co-polymer and nano-particulate mixture flows into and combines with a bioplastic melt-flow, where it is dispersed into a biopolymer to form a nano-bioplastic film for use in food packaging.

In another example, all or part of a package or packaging material that includes as part of the composition graphene platelets in a polymer matrix can be prepared for bioactivation in a high-intensity UV light chamber equipped with a xenon light source. The high-intensity UV light chamber can be a portable or household-sized unit, or can alternatively be a larger unit for use in a commercial bio-composting or other similar facility. The high intensity UV irradiation applied is advantageously sufficient to initiate free radical reactions that substantially convert graphene and polymerized graphene adducts within the packaging material into carbon dioxide, and water, and some residual graphene oxide. The exposure time and/or the UV intensity can be optimized based on factors such as the thickness of the packaging material and the concentration of graphene in the packaging material. After irradiation with the UV light, the packaging material is substantially activated for enhanced biodegradability and biocompostability. The activated packaging materials can be subsequently introduced into soils so that carbon dioxide and other organic products produced in the degradation of the packaging materials can be sequestered in the form of useful bacterial and plant matter, rather than being released directly as undesirable greenhouse gases. In this example, the materials are buried. Burial of the UV-degraded packaging material can provide a composing environment conducive to the growth of beneficial composting bacteria on the organic components of the packaging materials. Mineral clays and carbon ashes are returned to the soil to build up the useful structure of soils.

In another example, high aspect ratio nano-particles, such as graphene nano-particles in a polymer film, can be aligned in the direction of the plane of an extruded film using biaxial stretching in commercial blow-molding equipment. To provide this alignment, the graphene dispersion in the extruded film can be subjected to heating by microwaves applied normal to the plane of the biaxially stretched film. The microwave generating source can be placed online with processing equipment so that the radiation is isolated for safety reasons. The microwave irradiation can be directed into the film as it is being stretched. Cold air can be introduced at this point as needed to enable thermal control of the temperature of the film. Localized molecular heat energy as it is applied through the graphene nano-particles enables molecular-scale reduction of the modulus as required to molecularly orient the film and film particles while maintaining the large-scale bulk modulus required for enhanced biaxial stretching of the film. This mechanical and molecular forming method can perform both molecular co-polymer orientation and parallel orientation of graphene nano-particulate regions. The resultant increase in parallel nano-particle orientation inside the film can enhance diffusion resistance of the film to moisture or gases, such as for example oxygen, across the thickness of the film. Selective microwave irradiation of the film can be used to target regions of the film or packaging material having enhanced sealing rate properties and regions having enhanced barrier properties in the same process. Sealing rate enhancement can be optimized to a desired film process volume rate. The combination of both external cooling and internal heating can facilitate greater, more economical orientational and thermal process control of the material and can significantly increase the speed of the process line so that more volume of material can be processed in a given time. On a microscopic scale, stretching and forming operations can be designed to provide molecular alignment of graphene particles adjacent to each other as well as over each over in the material of the processed film. This alignment can provide enhanced barrier properties at openings or seams between parallel graphene layers above and below any given layer in the film, thereby achieving a very convoluted diffusion pathway which substantially limits gas or water vapor transmission as compared with traditional bio-polymers. This molecular level of orientational control can be provided by microwave processing as described herein. Considerable economic and competitive advantages can be provided compared with process lines that do not use methods and compositions according to one or more implementations of the current subject matter.

In another example, a process can incorporate technology involving the production of partially fermented starch polymers. A raw material can be a potato waste slurry originating from the food industry. The slurry consists of starch (approximately 72% of the dry matter), protein (approximately 12% o the dry matter), fats and oils (approximately 3%), inorganic components (approximately 10), and cellulose (approximately 3%). The slurry can be held in storage silos for about two weeks to allow for partial fermentation of starch to lactic acid. The product can be subsequently dried (for example to approximately 10% water final content) and extruded to obtain thermoplastic properties. Palm oil and additives such as titanium dioxide and calcium carbonate are added in the extrusion step to improve the properties of the product. The granular structure of starch can be destroyed by the combined use of shear, temperature and time to provide a homogeneous material with both amylopectin and amylose dispersed uniformly through the material. The properties of this destructurized starch can be improved by complexing, for example by blending with other polymers (such as for example polycaprolactone, polyvinyl alcohol, polylactic acid and other polyesters), nanofillers, plasticisers and fibers. The starch can be used as a polymer feedstock for use with one or more implementations of the current subject matter.

Figure 18:
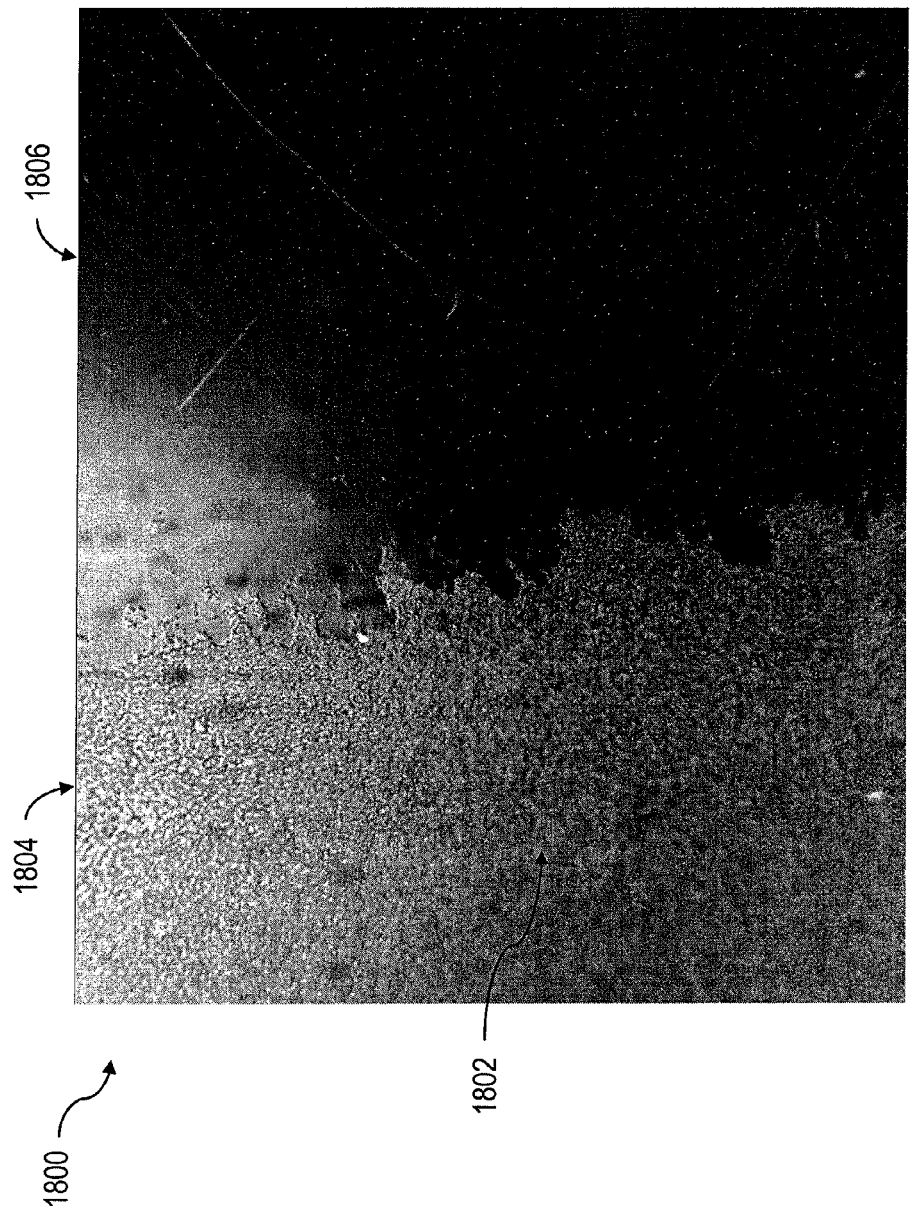
FIG. 18 is a visible light microscope image showing an etched and an unetched side of a piece of PET plastic under 4× magnification.
Figure 19:
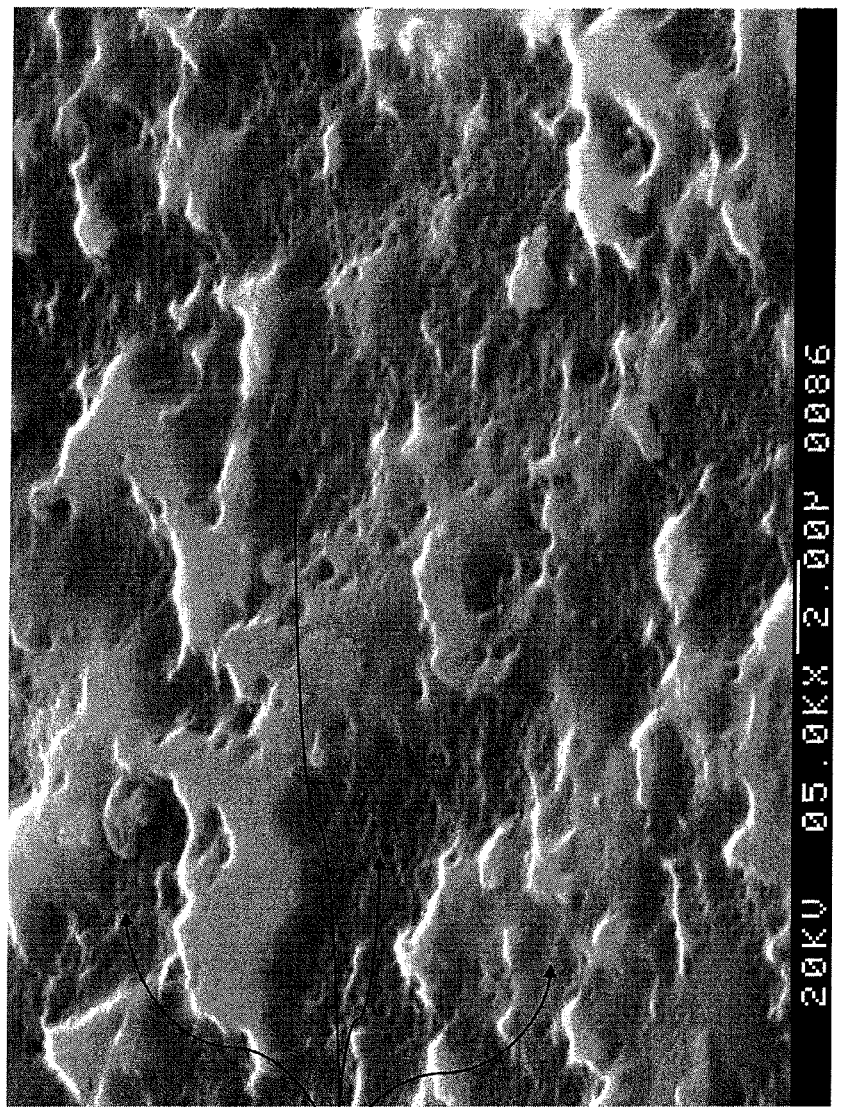
FIG. 19 is a scanning electron microscope image showing pits formed in a surface of the piece of PET plastic after exposure to light and moisture for a week.

In yet another example, a piece of PET plastic was prepared using a composition consistent with the current subject matter on one surface while the other surface was prepared using a conventional PET polymerization process. FIG. 18 shows a visible light micrograph 1800 at 4× magnification that illustrates etching (the white haze 1802) occurring on the first side 1804 of the piece of PET plastic while the second side 1806 shows no visible degradation. The image 1800 in FIG. 18 was taken after one week of exposure to ambient sunlight and condensation of atmospheric moisture (e.g. morning dew). The relative humidity during the exposure period varied from about 96% in the mornings to about 66% at the afternoon low point, while the temperature varied from a high of about 75° F. (i.e. about 24° C.) to an overnight low of about 55° F. (i.e. about 13° C.). FIG. 19 shows a scanning electron microscope image 1900 of the degraded PET piece shown in FIG. 18. The image was collected at 20 kV with a magnification of 5000×. At this scale, it is possible to see multiple pits 1902 that have been formed in the first PET surface 1804 due to the action of light and moisture.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A composition of matter comprising:
    a polymeric material;
    a plurality of photocatalytic particles dispersed within the polymeric material, the photocatalytic particles comprising a metal oxide and having effective diameters of greater than approximately 350 nm; and
    a plurality of conductive particles dispersed within the polymeric material, at least some of the plurality of conductive particles being in contact with one or more of the plurality of photocatalytic particles such that the at least some of the plurality of conductive particles provide electron donating and electron accepting properties to the one more photocatalytic particles with which the at least some of the plurality of conductive particles are in contact, the plurality of photocatalytic particles and plurality of conductive particles being oriented in a particular direction, the conductive particles having a platelet shape and arranged in parallel layers above and below any given layer in the composition.

2. A composition of matter as in claim 1, wherein the metal oxide comprises a non-toxic metal oxide selected from titanium dioxide ($TiO_2$), tungsten oxide ($WO_2$), and sodium tantalum oxide (NaTaO).

3. A composition of matter as in claim 1, wherein the metal oxide further comprises iron oxide.

4. A composition of matter as in claim 1, wherein the plurality of conductive particles comprise at least one of graphite particles, graphene particles, amorphous carbon pigment particles, hematite ($Fe_2O_3$), and C-60 buckminsterfullerene molecules.

5. A composition of matter as in claim 1, further comprising a plurality of ion-exchanged clay particles dispersed within the polymeric material.

6. A composition of matter as in claim 1, wherein the polymeric material comprises at least one of a polylactic acid (PLA), a polyamide, a polycarbonate (PC), a polyester, a polyurethane, a polypropylene (PP), a polyvinyl chloride (PVC), a polyethylene terephthalate (PET), a high density polyethylene (HDPE), a low density polyethylene (LDPE), a polystyrene, a polyhydroxyalkanoate (PHA), a polyhydroxybutyrate (PHB), a polyhydroxyhexanoate (PHH), a polyhydroxyvalerate (PHV), a polysaccharide, a polycaprolactone, a polyglycolic acid, a polyhydroxyvalerate, a poly(L-cysteine), a crosslinked soy oil, a crosslinked lethecin, and a wafer baked starch.

7. A composition of matter as in claim 1, wherein the polymeric material comprises at least one of chitin and chitosan.

8. A composition of matter as in claim 1, further comprising a light masking agent disposed at or proximate to an outer surface of the polymeric material, the light masking agent reducing an amount of light that reaches the plurality of photocatalytic particles during a useful life of an item comprising the composition of matter and being removable to allow degradation of the polymeric material once the item reaches an end of the useful life.

9. A composition of matter as in claim 8, wherein the light masking agent comprises at least one of an ion-exchanged montmorillonite, a pigment that reflects and/or absorbs light, a dye that reflects and/or absorbs light, inks, a film that reflects and/or absorbs light, and titanium dioxide (TiO$_2$) particles having an effective diameter less than approximately 350 nm.

10. A composition of matter as in claim 1, wherein the metal oxide comprises titanium dioxide, the titanium dioxide comprising anatase.

11. A composition of matter as in claim 1, wherein the photocatalytic particles have effective diameters of greater than approximately 1 micron.

12. A composition of matter as in claim 1, wherein the photocatalytic particles have effective diameters of greater than approximately 60 microns.

13. A composition of matter as in claim 1, wherein the photocatalytic particles and the conductive particles are connected by chemical bonds linked in space by polymer chains of the polymeric material.

14. A composition of matter comprising:
a polymeric material; and
a plurality of photocatalytic particles dispersed within the polymeric material, the photocatalytic particles comprising a metal oxide and having effective diameters of greater than approximately 350 nm, the plurality of photocatalytic particles having an orientation within the polymeric material,
the composition processed to form a film, wherein orientation is conferred to both polymeric and particulate regions to be substantially parallel to the plane of the film to change mechanical properties of the film while improving gas barrier and moisture resistance, such that a convoluted diffusion pathway exists in the film which substantially limits gas or water vapor transmission.

15. A composition of matter as in claim 1, wherein the composition has the ability to degrade upon activation with exposure to visible and/or ultraviolet (UV) light.

16. A composition of matter as in claim 15, wherein the ability to degrade comprises the ability to create an environment that promotes destructive free radical spallation reactions.

17. A composition of matter as in claim 1, wherein the composition is exposed to microwave heating, an electric field, or an electrostatic field to provide desired molecular orientations in self-assembled hybrid materials.

18. A composition of matter as in claim 1, wherein the plurality of conductive particles consist essentially of graphene platelets.

19. A composition of matter as in claim 14, wherein the composition has the ability to degrade upon activation with exposure to visible and/or ultraviolet (UV) light.

20. A composition of matter as in claim 19, wherein the ability to degrade comprises the ability to create an environment that promotes destructive free radical spallation reactions.

21. A composition of matter as in claim 1, wherein molecular alignment is varied between a transient or a permanent charge expressed at a photocatalytic particle or a conductive particle and a charge-oriented monomer within the polymeric material.

* * * * *